June 23, 1964 K. F. ROSS 3,138,705

ELECTRONIC ANALOG COMPUTER

Filed June 6, 1961 10 Sheets-Sheet 1

INVENTOR:

Karl F. Ross

ELECTRONIC ANALOG COMPUTER

INVENTOR:

Karl F. Ross

June 23, 1964 K. F. ROSS 3,138,705

ELECTRONIC ANALOG COMPUTER

Filed June 6, 1961

10 Sheets-Sheet 3

INVENTOR:

Karl F. Ross

June 23, 1964 K. F. ROSS 3,138,705

ELECTRONIC ANALOG COMPUTER

Filed June 6, 1961 10 Sheets-Sheet 4

INVENTOR:

ELECTRONIC ANALOG COMPUTER

Filed June 6, 1961

10 Sheets-Sheet 5

INVENTOR:

Karl F. Ross

June 23, 1964 K. F. ROSS 3,138,705

ELECTRONIC ANALOG COMPUTER

Filed June 6, 1961 10 Sheets-Sheet 6

INVENTOR:

Karl F. Ross

June 23, 1964 K. F. ROSS 3,138,705

ELECTRONIC ANALOG COMPUTER

Filed June 6, 1961 10 Sheets-Sheet 7

INVENTOR:

Karl F. Ross

INVENTOR.

Karl F. Ross

ELECTRONIC ANALOG COMPUTER

Filed June 6, 1961 10 Sheets-Sheet 9

*INVENTOR:*

Karl F. Ross

June 23, 1964 K. F. ROSS 3,138,705

ELECTRONIC ANALOG COMPUTER

Filed June 6, 1961 10 Sheets-Sheet 10

INVENTOR:

Karl F. Ross

United States Patent Office 3,138,705
Patented June 23, 1964

3,138,705

ELECTRONIC ANALOG COMPUTER

Karl F. Ross, 5121 Post Road, Riverdale, N.Y.

Filed June 6, 1961, Ser. No. 115,131
19 Claims. (Cl. 235—194)

(I) INTRODUCTION

My present invention relates to an electronically operated analog computer for the performance of a variety of mathematical operations.

It is an object of my invention to provide a computer adapted to perform electrically, with an accuracy approaching or even surpassing that of conventional slide rules, such operations as multiplication, division and the determination of roots and powers.

Another object of this invention is to provide means for rapidly carrying out mathematical operations of the general type $$(a_1 \pm a_2 \pm \ldots \pm a_m) \underset{\div}{\times} (b_1 \pm b_2 \ldots \pm b_n) \underset{\div}{\times} \ldots \underset{\div}{\times} (k_1 + k_2 \ldots \pm k_p)$$

i.e. the multiplication and/or division of a plurality of factors each of which may be composed of one or more terms additively and/or subtractively combined.

It is also an object of this invention to provide, in a logarithmic computer, means for enabling multiplication or division by factors both larger and smaller than unity.

Still another object of the invention is to provide, in a system adapted for the temporary storage of multiplicational and/or divisional factors of positive and negative sign, means for indicating the sign of the resultant product or quotient obtained by logarithmic addition or subtraction.

A further object of my invention is to provide means for producing an electric quantity, such as a voltage or a current, varying as the logarithm of a continuously varying input signal.

Broadly speaking, the invention realizes the foregoing objects through the provision of means for generating a current $i$ whose magnitude varies, throughout an interval during which the input signal $s$ changes from unity ($t=t_1$) to a particular value $S(t=T)$, according to the expression $$i=\frac{k \cdot ds}{s \cdot dt}$$

in combination with means for charging an accumulator stage, such as one or more condensers, with this current over the aforesaid interval whereby there is produced a charge $$Q=k\int_{t=t_1}^{T} i \cdot dt$$

whence, since the natural logarithm $\log_e$ or ln of a function is obtained through integration of the reciprocal value of that function, $Q=k.\log_e S$. This operation can then be successively repeated for each factor which enters either the numerator or the denominator of the final product, the corresponding charges being combined either additively or subtractively in the accumulator. The resultant final charge, when measured and read on a logarithmic scale or reconverted to the antilogarithm of its value, represents the product of the factors of the numerator divided by the product of the factors of the denominator; either of these products could, of course, be unity. In this manner it will be possible to compute a product such as $$\frac{S_1 \cdot S_2}{S_3}$$

by algebraically combining the corresponding charges to form the total $Q_1+Q_2-Q_3$.

As long as the input signal does not fall below the value of unity, or such other finite lower limit at which the system cuts off because of the limitations inherently imposed by the foregoing formula for the charging current, and as long as the time derivative of this signal does not exceed a predetermined value (e.g. unity) to be observed as an upper limit for the same reason, the charge $q$ on the accumulator stage will at any instant be proportional to the logarithim of the instantaneous signal value $s$; this necessitates, of course, that the charging current $i$ be reversed whenever the differential quotient $ds/dt$ changes in sign. Since, however, the above formula is independent of the path over which the signal changes from its initial value of unity to its ultimate value of S, means may be provided for allowing the system to operate even under circumstances in which the input signal and/or its slope does not invariably remain within the bounds given by the aforestated limits. Thus it is possible, in accordance with a further feature of my invention, to operate the system in a manner independent of the input signal, or to inactivate it completely, during periods in which the signal drops to a value of near zero; similarly, the charging current may be controlled to have a magnitude (e.g. zero) corresponding to a predetermined but not necessarily constant slope $ds/dt$ if the actual slope becomes temporarily so large as to exceed the limit of proportionality, the system then remaining in this condition until the slope of the input signal has been suitably reduced and until the value of the signal coincides with that which it would have reached if its slope had followed the assumed course.

For arithmetical computations, i.e. for use with abruptly changing input signals representing discrete mathematical factors, the general formula given above may be simplified. Thus, the signal $s$ may be caused to change exponentially from unity to its selected value S, in which case the charging current will be constant. In a more elaborate system, designed to enable the performance of additions and subtractions besides multiplications and divisions, the signal may be made to vary linearily with time so that its slope remains constant as this signal assumes a value representing the analog of a selected numerical operator to be fed into the computer. In this case, in which $$i=\frac{i_1}{t}$$

the terminal charge Q is proportional to $\log_e$ T. To produce the charging current $i$ of the main accumulator stage, I prefer to pass a constant control current over an interval from $t_0$ to T into a preliminary accumulator stage represented by another condenser or group of condensers; the voltage developed across the latter inversely controls the charging current of the principal or second stage which, however, remains cut off until $t=t_1$ at which time $i=i_1$. The preliminary stage is discharged preparatorily to the storage of a new multiplier or divisor thereon. If, however, another term $S_1$ is to be additively or subtractively combined with S, the same process is repeated (but with a reversal in the polarity of the charging current of each stage in the event of subtraction) over the interval from T to $T \pm T_1$ without a preliminary discharge of either stage; this results in an accumulation in the second stage of a charge $$Q+Q_1=\int_{t_1}^{T} i \cdot dt+\int_{T}^{T \pm T_1} i \cdot dt$$

whence $Q \pm Q_1=i_1 \log_e (T \pm T_1)-i_1 \log_e t_1=i_1 \log_e (T \pm T_1)$ since for $t=t_1$ that charge is at its reference or zero value. When, by such algebraic summation, two or more terms have been combined into a factor, a new multiplier or divisor can again be introduced by the discharge of the first stage, followed by the procedure already described. Before discharging this stage, however, it is necessary to observe that the absolute value of the first stage after one or more subtractions be not less than unity, i.e. the charge fed additively or subtractively into that stage during a unit interval from $t_0$ to $t_1$; otherwise the value corresponding to the factor last fed in will not be registered. In order to make such fractional factors count, however, I may supplement the residual charge of the first stage by a further charge so as to produce a predetermined (preferably decadic) multiple of its original value, this fact being recorded in a special register in order to be taken into account in the evalution of the final output.

Since capacitively stored electric charges are subject to leakage which may significantly alter their magnitudes over prolonged periods, I prefer to register the entire program of a selected series of computing steps on a suitable recording medium whereby the computer can be supplied with the necessary data in rapid succession and at a rate independent of the speed with which they are fed into the machine.

The above and other objects, features and advantages of my invention will become more fully apparent from the following detailed description of certain embodiments, reference being made to the accompanying drawing in which.

Figure 6A:
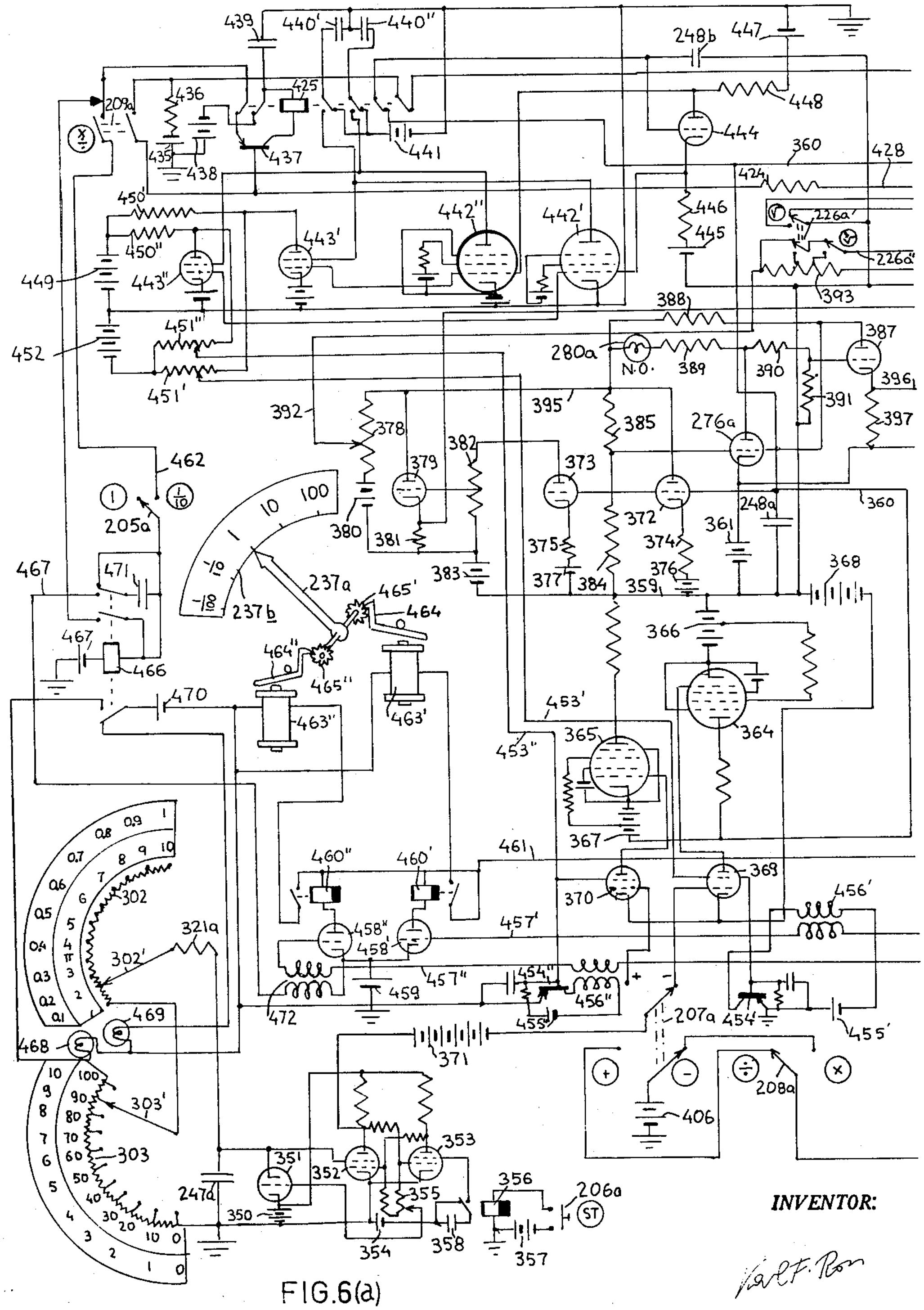
FIG. 6 is a circuit diagram of the calculator unit of the computer shown in FIGS. 2–4, divided into halves (*a*) and (*b*)
Figure 6B:
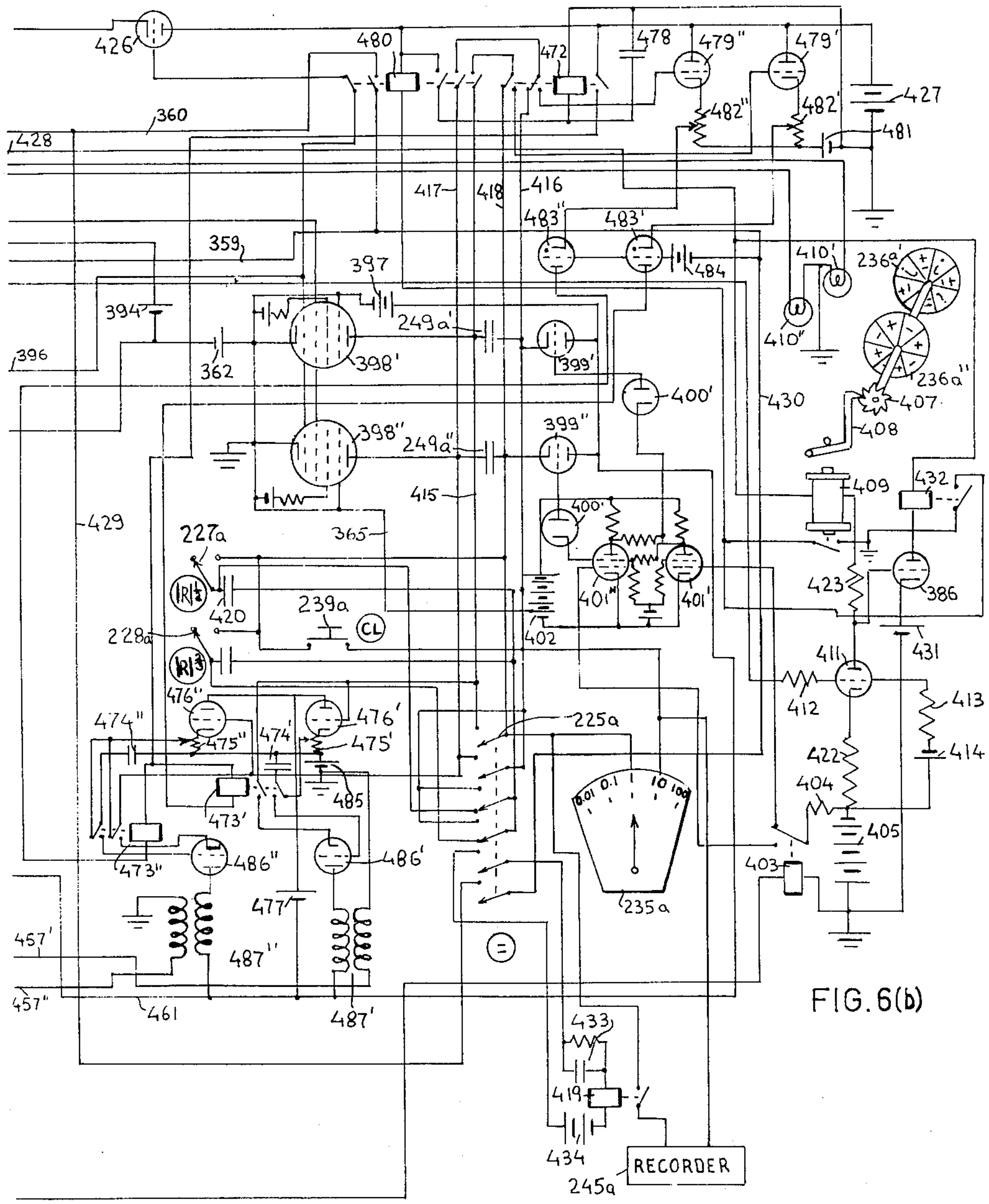
Figure 8:
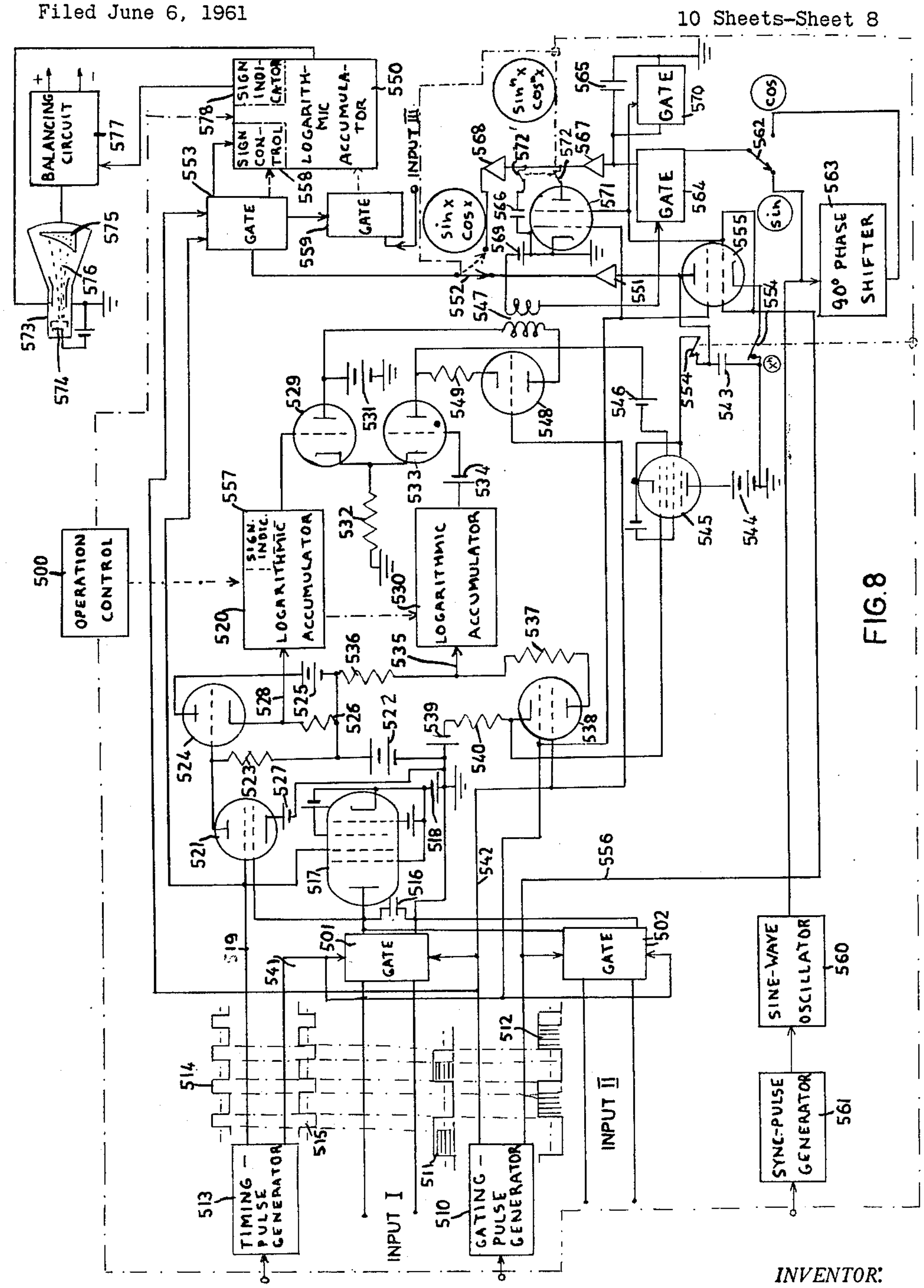
Figure 9:
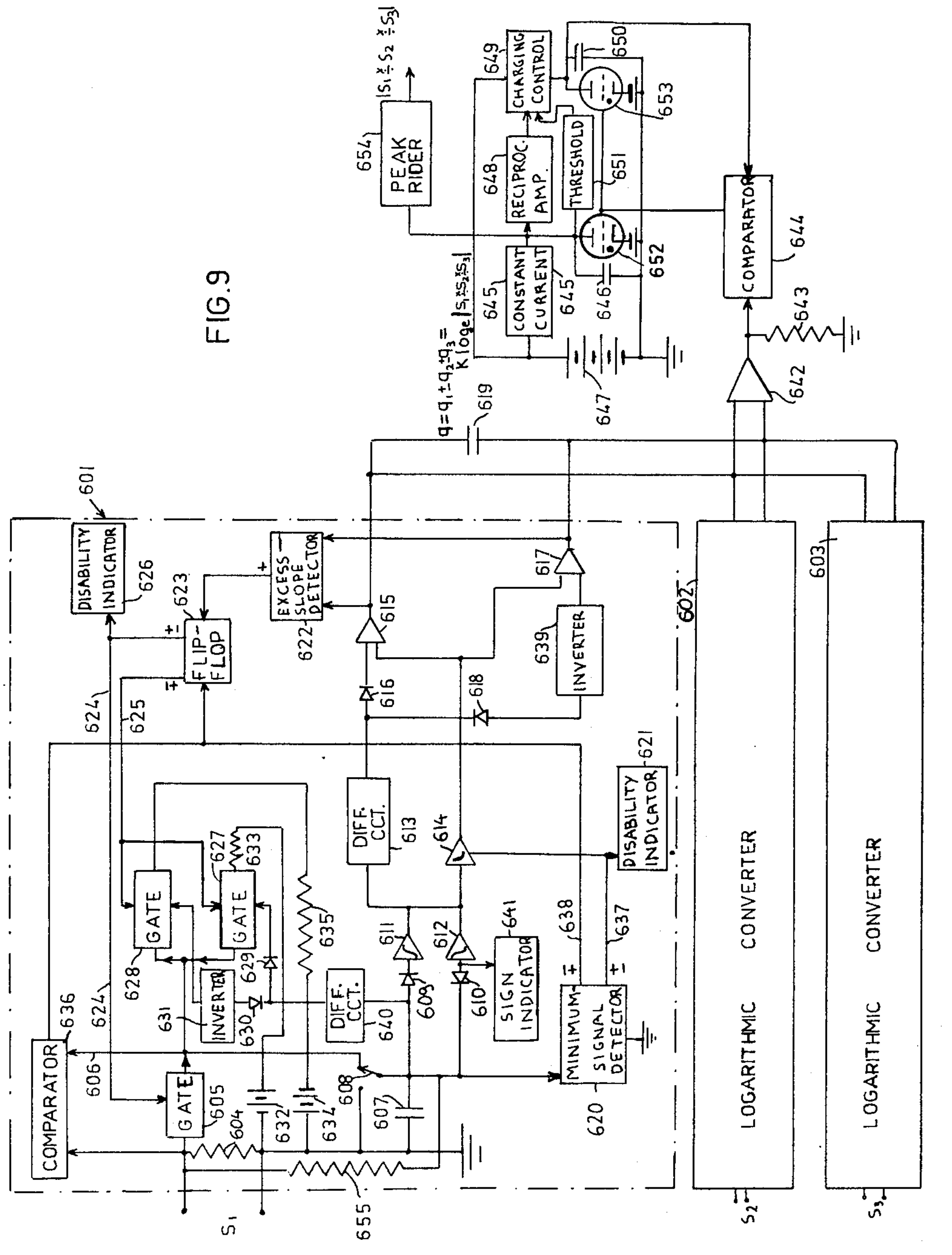
Figure 10:
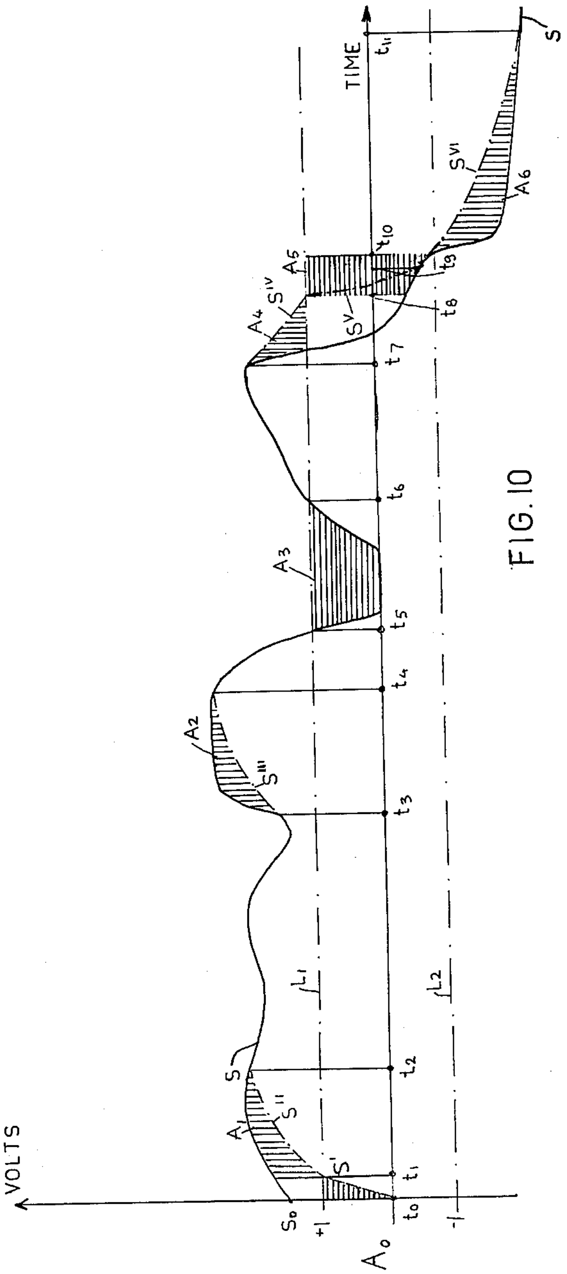

FIG. 8 diagrammatically illustrates another form of computer including calculator units as shown in FIG. 6;

FIG. 9 is a diagram generally similar to FIG. 8, illustrating a further embodiment of a computer according to the invention; and FIG. 10 is a graph used in explaining the operation of the system of FIG. 9.

(II) PRIMITIVE ELECTROLOGARITHMIC COMPUTER (FIG. 1)

Figure 1:
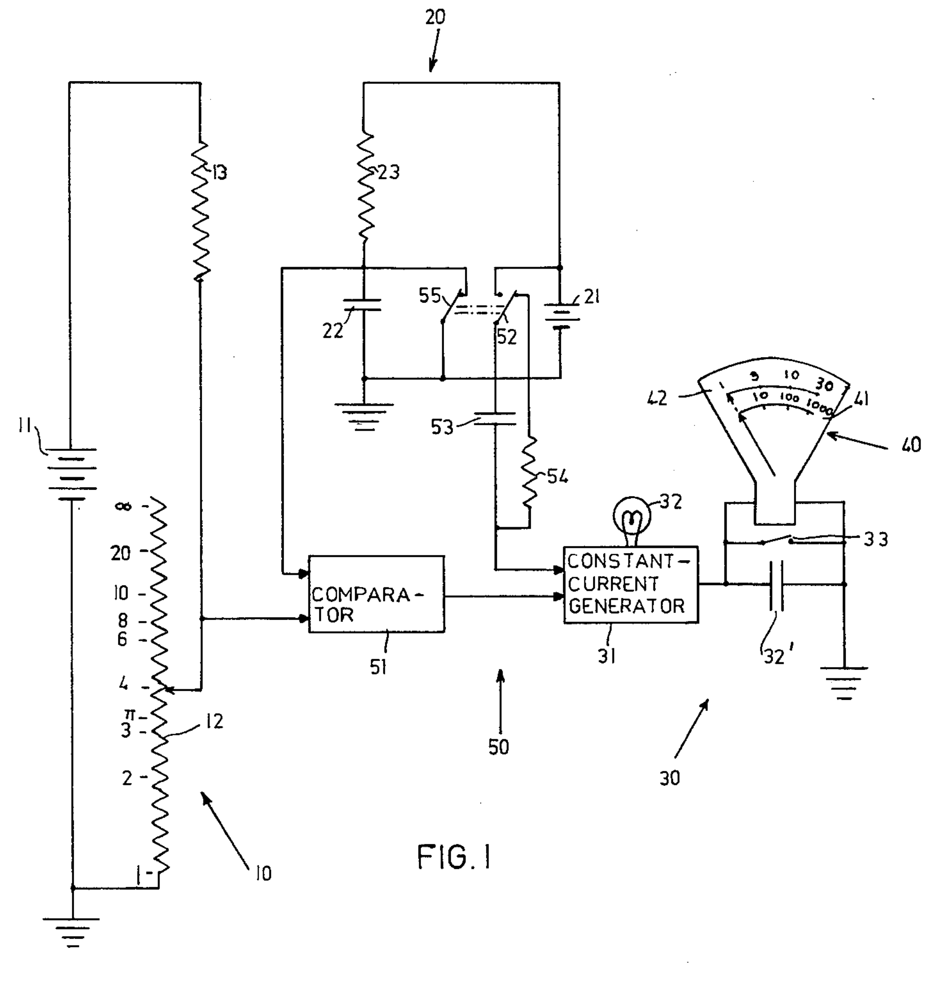
FIG. 1 is a circuit diagram of a simplified computer embodying some of the features hereinabove discussed.

In FIG. 1 I have shown a simple logarithmic computer capable of performing only multiplications. It comprises a controller 10 including a source 11 of direct current (here shown as a battery) connected across an adjustable part of a potentiometer 12 in series with a fixed resistor 13, a first accumulator stage 20 including a direct-current source 21 and a storage condenser 22 connected to be charged from it through a resistor 23, a second accumulator stage 30 including a constant-current generator 31 and a storage condenser 32, an indicator 40 connected across the latter condenser, and a timing circuit 50 for controlling the operation of generator 31 jointly from potentiometer 12 and condenser 22.

The circuit 50 includes a comparison network 51, whose inputs are respectively connected to the sliding tap of potentiometer 12 and to the junction between condenser 22 and resistor 23, having an output connected to one of two input terminals of generator 31; it further comprises a starting switch 52 adapted to establish a connection between the other input terminal of that generator and the ungrounded (positive) pole of battery 21 through the intermediary of a small condenser 53. Switch 52 in its unoperated condition connects a resistor 54 across condenser 53 to discharge it; a companion switch 55 discharges the condenser 22 more or less instantly, i.e. through a low-resistance path, when switch 52 is opened. A lamp 32', connected across generator 31, serves to indicate when the latter is in operation. A discharge switch 33 is connected across condenser 32.

In operation, potentiometer 12 is set to any value greater than unity, in cluding mixed fractions and irrational numbers such as $\pi$, which is to be fed into the computer. This value is communicated to comparator 51 which, however, remains inoperative until a like value is attained by the potential on the ungrounded terminal of condenser 22. The condenser begins to charge upon the opening of switch 55; the concurrent closure of switch 52 sends a starting pulse through condenser 53 to generator 31. It is to be understood that switches 52, 55 are representative of any means, including electronic gates of the type described hereinafter, for performing these operations simultaneously.

Condenser 22 charges at the rate $$\frac{V-v}{V}=e^{-t/RC}$$

wherein V is the voltage of battery 21, $v$ is the voltage across condenser 22, $e$ is the base of the natural logarithm and RC is the time constant of the network 22, 23. If we consider an input signal $$s\equiv\frac{V}{V-v}=e^{t/RC}$$

then $t=RC\log_e s$. Constant-current generator 31 charges the condenser 32 until it is stopped by the comparator 51 as the charging voltage of condenser 22 matches the control voltage selected by the setting of potentiometer 12. Thus, the charge on condenser 32 is proportional to the charging time $t$ and, therefore, to the logarithm of signal $s$. If several signals $s_a$, $s_b$ etc. of like or different magnitudes are consecutively fed into the computer in this manner, the total charge on condenser 32 represents the sum of their logarithms which can be read on scale 41 of indicator 40 as the product of these magnitudes. The indicator is read when lamp 32' is extinguished to signify the completion of the charging operation; when the desired product has been determined, condenser 32 is discharged by closure of switch 33.

The apparatus so far described is capable of computing products of two or more positive factors as well as powers with integral positive exponents. Indicator 40 is shown, however, to comprise a second scale 42 which, unlike scale 41 calibrated to give the antilogarithm of the value stored on condenser 32, displays the square root thereof; in the same manner other scales, designed to indicate further roots, powers, multiples or fractions, may be provided in addition or interchangeably with those shown.

Though the potentiometer 12 could be connected directly across charging battery 21, with omission of fixed resistance 13, this would result in a scale spread at the potentiometer which would be inconvenient for most purposes since, owing to the non-linear relationship between $s$ and $v$, the value "2" would then appear at the midpoint of the potentiometer while the values greater than "4" would be crowded into the last quarter thereof. The scale actually illustrated, in which "4" is at the midpoint and "10" at the three-quarter mark, assumes a voltage E for battery 11 which is one and one-half times as high as the voltage V of battery 21. Generally, the voltages of these batteries are related to each other by the formula $$E=V\left(1+\frac{1}{s_m-2}\right)$$

$s_m$ being the signal value (greater than 2) to be registered at the midpoint of the potentiometer, so that advantageously the voltage of battery 11 will exceed that of battery 21 by a fraction. The ratio of the resistance of potentiometer 12 (measured between its terminals "1" and "∞") to the combined resistance of this potentiometer and of the fixed series resistor 13 equals the voltage ratio $V/E$, whereby for $s=\infty$ the potentiometer voltage matches the voltage V of battery 21.

It will be understood that the apparatus shown in FIG. 1 has an operating range limited by the magnitude of the charge which the condenser 32 can accept from the generator 31 without affecting its constant-current characteristic. The indicator 40 may, of course, be connected across the condenser not directly but through a suitable linear amplifier to permit the charging of the condenser at a relatively slow rate.

(III) COMPUTER OPERATING WITH DISCRETE QUANTITIES

Figure 2:
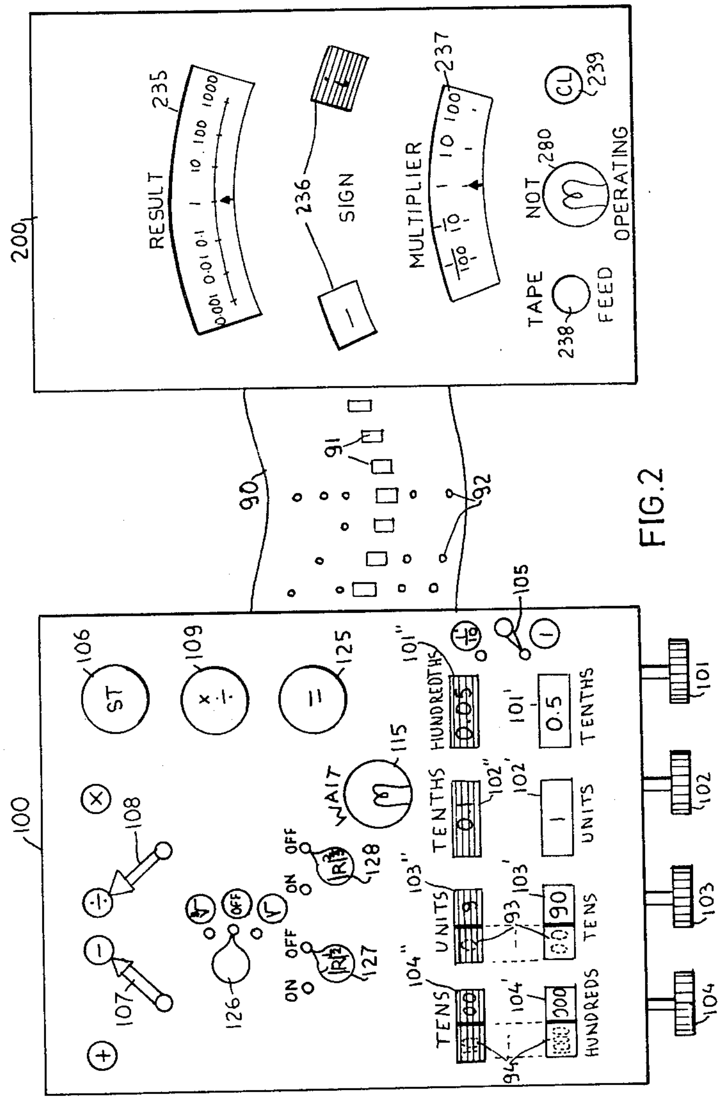
FIG. 2 illustrates, somewhat schematically, the physical layout of a computer representing a preferred embodiment.
Figure 3:
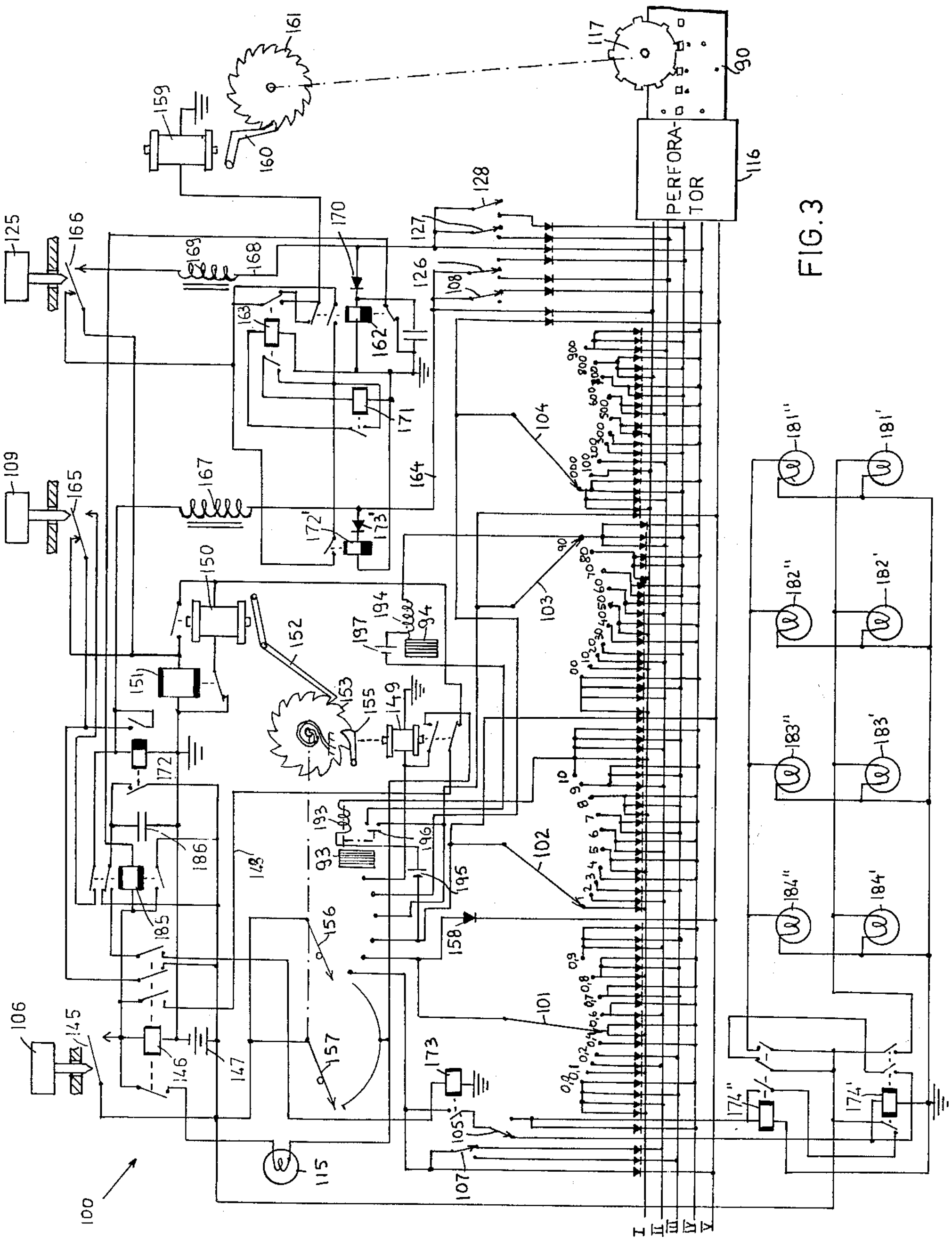
FIGS. 3 and 4 are circuit diagrams of the principal units of the computer shown in FIG. 2.
Figure 4:
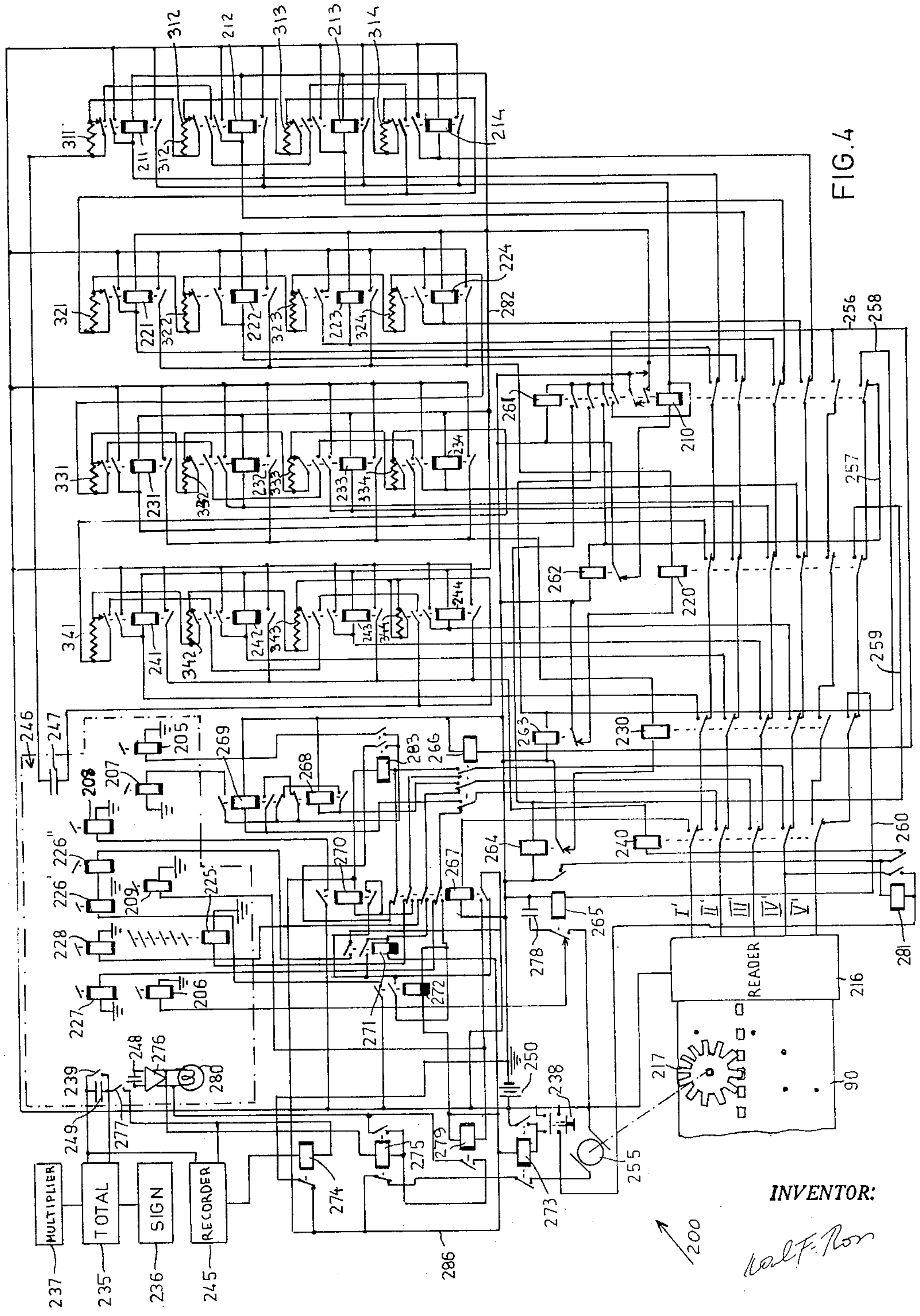

(III*a*) *Semi-Automatic System* (*FIGS. 2–4*)

In FIGS. 2–4 I have illustrated the external aspects of a more elaborate computer utilizing an inversion of the operating principles of the device shown in FIG. 1. It comprises a controller 100 connected, via a storage medium shown for the sake of illustration as a perforated tape 90, to a calculator 200. The tape 90, of the type conventionally used in message-storing devices (e.g. in the teleprinter art), is perforated by known coding equipment 116 (FIG. 3) in unit 100 and read by suitable decoding means 216 (e.g. with the aid of sensing pins or through translumination) in unit 200 (FIG. 4). It is provided with perforations 91 engageable by the teeth of a feeding sprocket 117, 217 at each unit. A five-element code, represented by the perforations 92, is sufficient to transmit any four-digit number along with the various operational commands adapted to be given by the control panel of unit 100.

The controller 100 comprises four setting knobs 101, 102, 103, 104 for selecting respective digits of a number to be fed into the calculating device 200 by way of the coding and decoding equipment 116, 216 and tape 90. These knobs serve for the setting of four numerical reels viewable through windows 101′, 102′, 103′, 104′ and 101″, 102″, 103″, 104″ in the frame of the unit. The four reels mounted on the shafts of knobs 101–104 are made of translucent material and are illuminable from within by two sets of lamps which are controlled by a switch 105. When this switch is in its downturned position, as shown in FIG. 2, the lower set of lamps are lit to illuminate the windows 101′–104′ respectively marked "tenths," "units," "tens" and "hundreds"; with the switch in its alternative (upturned) position, these lamps would be extinguished and the windows 101″–104″ would light up, the latter being respectively marked "hundredths," "tenths," "units" and "tens."

Each of the knobs 101–104 has ten positions in which the associated reel displays different numerals varying in one digit from zero to nine, the decadic position of this digit being indicated by the labeling of the corresponding window. The reel of knob 102, however, differs from those of the other knobs in that its zero position "0(0.0)" corresponds physically to a value of either "1" or "0.1," depending on the setting of switch 105. Thus, the numbers selector represented by these knobs can choose only numbers upward of 1 in the lower position and upwards of 0.1 in the upper position of switch 105. To avoid confusion, I provide the pair of windows 103′, 103″ and the pair of windows 104′, 104″ with respective "carry" shutters 93, 94 which are normally in the left-hand position illustrated; when knob 102 is at zero, shutter 93 is moved to the right to the next-higher numerical indication on reel 103 (e.g. "6" and "60" instead of "5" and "50" or "0" and "00" instead of "9" and "90") whereas in the last-mentioned case, i.e. with knob 102 at "0(0.0)" and knob 103 at "9(90)," shutter 94 is also shifted to the right with a similar carry effect. Hereinafter, however, all knob positions will be referred to in accordance with their physical significance only, as applied to the lower position of switch 105. The position illustrated in FIG. 2, in which each knob setting has the displayed value, represents the number "091.5."

Completion of the selection of a number by means of knobs 101–104 is indicated by actuation of a starting key 106 which causes the recording, on tape 90, of the position of switch 105, the settings of the selector knobs, the position of an add-subtract switch 107, the position of a multiply-divide switch 108, and a starting signal. If the next number is to be added or subtracted from the one already registered, the process is repeated with or without adjustment of switch 107, as required. This mode of operation is continued until all the additive and subtractive constituents of a factor have been entered.

Multiplication or division, as distinguished by the setting of switch 108, is initiated by actuation of a key 109 and the consequent registration of a factorial code on tape 90 ahead of the starting signal entered upon the next operation of key 106. The new factor serving as a multiplier or divider may again be the algebraic sum of several terms of like or different sign.

When all the desired operations have been registered, a "solution" key 125 is depressed to record a corresponding code on the tape 90. This operation also causes a further advance of the tape, without additional code perforations, to provide enough slack for a subsequent take-up of its information-bearing portion by the calculating unit 200.

The panel of unit 100 also has a three-position switch 126 and two on-off-type switches 127 and 128. Switch 126 serves for taking square and cube roots of one or more factors; when it is in either of its operated positions, a corresponding code combination is registered on tape 90 upon the actuation of key 109. Switches 127 and 128 are used to reduce the reading of the indicator to a fractional power of the absolute value of the result originally computed, the fractional powers here shown being ½ (square root) and ⅔ (cube root of the square); their "on" setting is registered on the tape upon the actuation of key 125. It should be noted that simultaneous or successive operations of switches 127 and 128 (each followed by an operation of key 125) yields the cube root, whereas successive actuations of key 125 with either or both of these switches closed furnishes powers of ¼, 4/9, ⅛ and so forth. The operations of switch 126, on the other hand, are mutually exclusive so that either the square root or the cube root of a factor (including one or more terms registered between successive actuations of key 109) may be taken; operation of switch 126 to "cube root" position does not change the sign of the result, whereas its operation to "square root" position will require multiplication of the final product by the imaginary number $i$ if the sign of the factor had been negative.

A "wait" lamp 115, lighting upon the operation of start key 106, indicates by its extinction that the apparatus is ready to receive further instructions.

The calculating unit 200 comprises an indicator 235 for the result of the computation, giving its absolute numerical value; an indicator 236, which displays the sign "+" or "−" in its left-hand window and either "±" or "$i$" in its right-hand window, these windows being alternately lit; and a multiplier indicator 237, which shows whether or not the total is to be multiplied by a decadic factor here ranging from 1/1000 to 1000. There is also provided a starting key 238, which initiates the feeding of freshly perforated tape 90 to the calculator, and a restoring key 239, which clears the two accumulator stages and restores the indicator 235 to zero. A lamp 280, when lit, signifies that the indicator system is not operating normally because of the presence of a charge in the first stage which is less than a unit charge corresponding to a numerical value of either "one" or "one-tenth," depending on the position of switch 105.

I shall now describe, with particular reference to FIG. 3, the detailed operation of controller 100 in perforating the tape 90 to transmit the several selector signals to calculator 200.

The perforator 116 is provided with five input leads respectively designated I, II, III, IV, V. The following table gives an illustrative example of a five-element code of perforations adapted to be used with the system of FIGS. 2–4.

OPERATION OF KEY 106

| | I | II | III | IV | V |
|---|---|---|---|---|---|
| Start signal | — | — | — | — | 0 |
| Switch 107: on "+" | — | — | 0 | — | — |
| on "−" | — | 0 | — | — | — |
| Switch 105: on "1/10" | — | — | — | 0 | — |
| on "1" | — | — | — | — | — |
| Knob 101: setting "0.0" | 0 | 0 | 0 | 0 | 0 |
| "0.1" | 0 | — | — | — | 0 |
| "0.2" | — | 0 | — | — | 0 |
| "0.3" | — | — | 0 | — | 0 |
| "0.4" | — | — | — | 0 | 0 |
| "0.5" | 0 | — | — | 0 | 0 |
| "0.6" | — | 0 | — | 0 | 0 |
| "0.7" | — | — | 0 | 0 | 0 |
| "0.8" | 0 | — | 0 | 0 | 0 |
| "0.9" | — | 0 | 0 | 0 | 0 |
| Knob 102: setting "1" | 0 | — | — | — | 0 |
| "2" | — | 0 | — | — | 0 |
| "3" | — | — | 0 | — | 0 |
| "4" | — | — | — | 0 | 0 |
| "5" | 0 | — | — | 0 | 0 |
| "6" | — | 0 | — | 0 | 0 |
| "7" | — | — | 0 | 0 | 0 |
| "8" | 0 | — | 0 | 0 | 0 |
| "9" | — | 0 | 0 | 0 | 0 |
| "10" | 0 | 0 | 0 | 0 | 0 |
| Knob 103: setting "00" | 0 | 0 | 0 | 0 | 0 |
| "10" | 0 | — | — | — | 0 |
| "20" | — | 0 | — | — | 0 |
| "30" | — | — | 0 | — | 0 |
| "40" | — | — | — | 0 | 0 |
| "50" | 0 | — | — | 0 | 0 |
| "60" | — | 0 | — | 0 | 0 |
| "70" | — | — | 0 | 0 | 0 |
| "80" | 0 | — | 0 | 0 | 0 |
| "90" | — | 0 | 0 | 0 | 0 |
| Knob 104: setting "000" | 0 | 0 | 0 | 0 | 0 |
| "100" | 0 | — | — | — | 0 |
| "200" | — | 0 | — | — | 0 |
| "300" | — | — | 0 | — | 0 |
| "400" | — | — | — | 0 | 0 |
| "500" | 0 | — | — | 0 | 0 |
| "600" | — | 0 | — | 0 | 0 |
| "700" | — | — | 0 | 0 | 0 |
| "800" | 0 | — | 0 | 0 | 0 |
| "900" | — | 0 | 0 | 0 | 0 |

OPERATION OF KEY 109

| | I | II | III | IV | V |
|---|---|---|---|---|---|
| Operating signal | 0 | — | — | — | — |
| Switch 126: on "square root" | — | 0 | — | — | — |
| open | — | — | — | — | — |
| on "cube root" | — | — | 0 | — | — |
| Switch 108: on "×" | — | — | — | — | — |
| on "÷" | — | — | — | 0 | — |

OPERATION OF KEY 125

| | I | II | III | IV | V |
|---|---|---|---|---|---|
| Operating signal | — | — | — | 0 | — |
| Switch 127: on | — | 0 | — | — | — |
| off | — | — | — | — | — |
| Switch 128: on | — | — | 0 | — | — |
| off | — | — | — | — | — |

Key 106 controls a contact 145 which, when this key is depressed, energizes a relay 146 over an obvious circuit including a current source shown as a battery 147. Relay 146, over its inner right-hand armature, applies a pulse to a conductor 148 which is connected, via an armature and back contact controlled by an electromagnet 149, to the winding of another electromagnet 150 and thence to ground via an armature and back contact of a relay 151. Magnet 150, on being thus energized, attracts a pawl 152 to step a ratchet 153 against the force of a restoring spring 154. The ratchet 153, which is held against backward movement by a retaining pawl 155, entrains two wiper arms 156, 157 of which the latter closes a holding circuit for relay 146 upon stepping off its normal position. Relay 146 locks over its left-hand armature and front contact in series with "wait" lamp 115 which lights.

The closure of key 145 also completes an operating circuit for a relay 185 via the lower armature and back contact of a slow-releasing relay 162. Relay 185, while locking over its lower armature and front contact, momentarily energizes a relay 173 by discharging a condenser 186, previously held at the potential of battery 147, through its own inner upper armature and front contact and the winding of relay 173. The latter relay thus operates as soon as ratchet 153 has taken its first step to advance the wipers 156 and 157 and, with wiper 156 on its first bank contact, closes a circuit from that bank contact to switch 105 to energize either of two relays 174′ and 174″, depending upon the position of that switch. If switch 105 is in its "1/10" position, the operation of relay 174″ is accompanied by the application of a positive pulse to lead IV.

Relay 174′, when energized, locks over its inner right-hand armature and front contact in series with the intermediate armature and back contact of relay 174″ whose own holding circuit is simultaneously broken at the left-hand armature and back contact of relay 174′. The latter relay, over its outer right-hand armature and front contact, also closes a circuit to light four lamps 181′, 182′, 183′, 184′, respectively illuminating the windows 101′, 102′, 103′, 104′ (FIG. 2) to display the lower sets of markings on the reels controlled by knobs 101–104. If, on the other hand, relay 174″ is operated, it opens the holding circuit of relay 174′ and locks over its inner armature and front contact in series with the left-hand armature and back contact of its companion relay; at its outer armature and front contact the relay 174″ lights four lamps 181″, 182″, 183″, 184″ respectively illuminating the windows 101″, 102″, 103″, 104″ to display the upper sets of markings of the knob-controlled reels. With relay 185 remaining energized for the remainder of the operations until key 125 is depressed, it will not be possible in the course of these operations to change the lighting of the lamps 181′–184′ and 181″–184″, or effectively to alter the setting of switch 105, except by the actuation of key 109 hereinafter described.

The stepping of wiper arm 156 onto its first bank contact also connects lead V along with either of leads II and III (depending on the position of switch 107) to potential via respective diodes shown schematically as rectifiers 158. This causes the perforator 116 to puncture the tape 90 at corresponding locations, thereby producing a code signal which includes a perforation (designated by "0" in the foregoing table) in the No. V position and one or two additional perforations in the No. II or No. III and possibly in the No. IV position. The operation of magnet 150 also attracts an armature thereof onto its front contact to energize the relay 151 and, concurrently an electromagnet 159 which retracts its pawl 160 from a ratchet 161 coupled with the tape-feeding sprocket 117. The operating circuit of magnet 159 can be traced from ground through its winding over an armature and back contact of the slow-releasing relay 162, the back contact of a reversing armature of relay 163 and an unoperated contact 166 controlled by key 125 to battery on conductor 148. Relay 151 energizes and opens the circuit of magnet 150, thereby releasing the pawl 152 and de-energizing the magnet 159 so that pawl 160 is restored by its spring (not shown) to advance the ratchet 161 and the sprocket 117 by one step. Thus, tape 90 is moved to a new position in readiness for the next perforation code.

The de-energization of magnet 150 also releases the relay 151 which thereupon re-energizes the magnet so as to advance the ratchet 153 and the wipers 156, 157 by one further step. Wiper 156 now stands on its second bank contact which is connected to the switch arm of knob 101 whereby the wires I–IV are selectively connected to potential in accordance with the code given in the preceding table. The same bank contact is also directly connected to wire V over an associated isolating diode 158. With the particular position of knob 101 illustrated in FIGS. 2 and 3, representing the value "0.5," wires I and IV will be energized to actuate the perforator 116 accordingly.

The stepping mechanism 150, 151, 159 now again causes the advance of first the tape 90 and then the wipers 156 and 157, wiper 156 alighting on its third bank contact and connecting battery to lead V as well as to one or more of the other leads in accordance with the setting of the switch arm of knob 102. In the specific position illustrated, arm 102 stands on its first contact and energizes only the lead I, in conformity with its setting "1." If it were set to "10," it would complete a circuit for the energization of a solenoid 193 from a battery 195 to shift the "carry" shutter 93 to the right and to close a contact 196 for the completion of a similar circuit for the energization of a solenoid 194, controlling the shutter 94, from a battery 197 via arm 103 in its illustrated position "90."

The next step, upon which wiper 156 engages its fourth bank contact, causes the application of battery potential to wire V and a combination of wires II, III and IV, in conformity with the setting "90" of knob 103.

The following step brings wiper 156 onto its fifth bank contact and energizes all five leads I–V in accordance with the setting "000" of knob 104.

The final step brings wiper 156 onto its sixth bank contact to energize the magnet 149 which withdraws the retaining pawl 155 from ratchet 153, at the same time breaking the operation circuit of magnet 150; the concurrent release of magnet 159 causes the feeding ratchet 117 to take one further step. Magnet 149 locks over its upper armature and front contact to the homing arc of wiper 157 and thus remains energized until the ratchet 153 and its wipers have returned to normal. At that instant the relay 147 releases and the lamp 115 is extinguished.

The operator can now repeat the process with the same or a different setting of the knobs 101–104 and of the associated switches. If key 109 is not actuated at this time, the new number will be added or subtracted in dependence upon the position of switch 107. If, however, multiplication or division is desired, as selected by the setting of switch 108, the operator now briefly depresses the key 109 before reoperating the key 106 to introduce the next number.

The momentary actuation of key 109 has the effect of connecting battery over the right-hand intermediate armature and back contact of relay 146 and the uppermost armature and front contact of relay 185 to a lead 164 by way of a contact 165 controlled by this key. This operation energizes the wire I and simultaneously, if switch 108 is in its "divide" position, the wire IV. Wire II or III is energized at the same time if switch 126 is in a position other than its "off" position. It will be apparent that this operation can be performed only after the relay 146 has released. Such release, occurring after completion of the steps initiated by actuation of key 106, also energizes the electromagnet 159 over a circuit which includes the unoperated contacts 165 and 166 respectively controlled by keys 109 and 125; the concurrent energization of relay 151 is without effect. As key 109 is depressed, the aforementioned energizing circuit of magnet 159 is broken so that pawl 160 advances the ratchet 161 by one step; lead 164 is shown to include a retarding coil 167 to insure that operation of the perforator in response to actuation of key 109 will occur only after the tape 90 has again come to rest.

The actuation of key 109 also causes the contact 165 to energize a slow-releasing relay 172 which locks over its right-hand armature and front contact to battery on the intermediate right-hand armature of relay 146. A subsequent operation of key 106 causes the release of relay 172, but not before the latter has momentarily operated the relay 173 over its own left-hand armature and front contact and the outer right-hand armature and front contact of relay 146. Relay 173, which again attracts its armature an instant after wiper 156 has stepped onto its first bank contact, operates to energize via switch 105, as before, either of the two relays 174′ and 174″ and, if switch 105 is in its "1/10" position, to transmit another positive pulse to lead IV.

When all the commands for the desired arithmetical operations have been given to controller 100, key 125 thereof is depressed to give the final execution signal. This again deenergizes the magnet 159 and, over a circuit including the back contact of relay 146 as well as contact 165 in series, applies potential to lead 168 which is shown to include a retarding coil 169 for the purpose described. The potential on lead 168 is applied to wire IV and, if switches 127 and/or 128 are closed, concurrently to wires II and/or III. At the same time the slow-releasing relay 162 is energized over a rectifier 170 to attract its armatures and to prepare a circuit for the operation, upon the restoration of key 125 to normal, of a stepping relay 171 which thereupon energizes the co-operating relay 163; the latter at its left-hand armature and back contact releases the relay 171 whereby the two relays 163, 171 will operate alternately as long as relay 162 remains energized. The energization of relay 162 also releases the relay 185, thus preventing any further effective actuation of key 109.

The intermittent operation of relay 163 pulses the magnet 159 over the right-hand armature of that relay whereby the ratchet 117 is stepped to advance the tape 90 until the relay 162 releases. This operation affords sufficient slack to let the calculator 200 subsequently take up all the perforated portion of the tape.

An intermittent energization of relays 163 and 171 to step the ratchet 161 occurs also for a brief period following the actuation of key 109, under the control of a slow-releasing relay 172′ which is energized from lead 164 over a rectifier 173 when that key is depressed. Relay 172′, over its armature and front contact, prepares an operating circuit for relay 171, which, like the one established by relay 162, extends from battery 147 over the intermediate right-hand back contact and armature of relay 146, contacts 165 and 166 in their normal positions, and the left-hand back contact and armature of relay 163. The delay period of relay 172′ is preferably less than that of relay 162 so that the tape 90 takes only a few steps after the release of the multiply-divide key 109; this limited advance of the tape insures that, upon the subsequent feeding of the pre-recorded program to the calculator, the introduction of each new factor will be preceded by a test interval during which a voltage-level detector at the second accumulator stage ascertains whether the preceding operations had left at least a unit charge stored in that stage. If this is not the case, lamp 240 will light and further feeding of the tape into the calculator 200 will be suspended until, in a manner to be described, a supplemental charge has been introduced.

Reference will next be made to FIG. 4 for a discussion of the effects of the aforedescribed code combinations, upon their decoding by the reader 216, on a logarithmic totalizer according to the invention which controls the indicators 235, 236, 237 as well as a recorder 245. The totalizer, shown diagrammatically at 246, will be described in detail with reference to FIG. 6; in FIG. 4 it is merely shown to include an input condenser 247, a first accumulator stage represented by a condenser 248, a second accumulator stage represented by a condenser 249, and a plurality of relays 205, 206, 207, 208, 209, 225, 226′, 226″, 227 and 228. Relays 205–209 and 225 perform the functions associated with switching elements 105–109 and 125, respectively; relays 226′ and 226″ take square and cube roots, as determined by the position of switch 126, whereas relays 227 and 228 operate in response to switches 127 and 128 if the latter are in their "on" positions during actuation of key 110.

A set of five leads I′, II′, III′, IV′, V′, emanating from reader 216, correspond to the wires I–V of FIG. 3 and are respectively energized by positive voltage from a current source 250 in response to the scanning of appropriately positioned perforations on tape 90 by reader 216. The sprocket 217 serving to advance the tape is driven from a motor 255.

The leads I′–V′ extend over the armatures of four group relays 210, 220, 230 and 240 each associated with a respective digit of a four-digit number adapted to be registered by the knobs 101–104 of FIG. 2. The back contacts of the inner four of the six lower armatures of relay 210 are connected to the windings of respective digit-storing relays 211, 212, 213 and 214 constituting the first vertical column of a sixteen-relay array; the corresponding front contacts lead to the windings of a second column of digit-storing relays 221, 222, 223 and 224. In like manner the front contacts of the inner four of the six armatures of relay 220 are connected to the windings of a third column of digit-storing relays 231, 232, 233 and 234, the back contacts of these same armatures being connected to the corresponding armatures of relay 210. Again, the inner four of the six armatures of relay 230, which are connected to back contacts of corresponding armatures of relay 240, have their own back contacts tied to the corresponding armatures of relay 220 while their front contacts are connected to the windings of respective digit-storing relays 241, 242, 243 and 244 constituting the fourth column of the array. A circuit extends from wire V′ over the fifth (lowermost) armature of relay 240 and the fifth armatures of relays 210, 220 and 230, by way of their respective front contacts, to a lead 256 and thence to ground via the winding of a relay 266. Another circuit extends from lead V′ through the lowermost armatures of relays 210, 220, 230 and 240 and their respective back contacts to a lead 257. Leads 258, 259 and 260 extend from the front contacts of the lowermost (sixth) armatures of relays 210, 220 and 230, respectively.

A relay 261 is energizable over lead 256 in parallel with relay 266. Four further relays 262, 263, 264 and 265 are respectively energizable over leads 257, 258, 259 and 260. Relays 262, 263, 264, 265 each have an armature and back contact for opening the operating circuits of relays 210, 220, 230 and 240, respectively. Relay 265 further has its left-hand armature connected in series with a condenser 278 which is charged from battery 250 in the energized state of the relay and discharges through the winding of relay 206 when relay 265 releases.

Each of relays 211–214, 221–224, 231–234 and 241–244, when unoperated, short-circuits a respective resistor 311–314, 321–324, 331–334 and 341–344; these resistors are all interconnected in a series circuit across the condenser 247. Moreover, the relays 211–214, 231–234 and 241–244 of the first, third and fourth columns are provided with supplemental contacts and armatures to short-circuit the entire chain of associated resistors 311–314, 331–334 and 341–344 when all four relays of one of these columns are operated simultaneously. The magnitudes of the resistances of potentiometer sections 311, 312, 313 and 314 have the ratio of 1:2:3:4; the same ratio prevails for the corresponding resistors associated with the remaining three columns of relays. The resistors of each horizontal row of the array, e.g. resistors 311, 321, 331 and 341, have progressively larger resistances whose magnitudes are in the ratio of 1:10:100:1000. It will be noted that, with at least one relay of each column operated, the minimum resistance connected at any time across condenser 247 will be that of resistor 321; this will be the case when every relay except relays 222, 223 and 224 is energized to denote the selector position "001.0." A simultaneous release of all sixteen relays, during which the condenser 247 is short-circuited, occurs only momentarily before the decoding of a new number.

The front contacts associated with the four inner armatures of relay 240, which are each linked with a corresponding lead I′–IV′, are connected respectively to the winding of a relay 267 and to the three armatures of relay 266. The inner armature of the latter relay has a front contact tied to the winding of a relay 283, which controls relay 205, and a back contact connected to the winding of relay 225 via the second-highest armature and back contact of relay 267. The intermediate armature of relay 266 has a front contact connected to the winding of a relay 268 and a back contact connected via the third-highest armature and back contact of relay 267 to the winding of relay 228. The outermost armature of relay 266 has its front contact tied to the winding of a relay 269 and its back contact connected over the innermost upper armature and front contact of relay 267 to the winding of relay 227. The front contacts associated with the inner three upper armatures of relay 267 are respectively connected to the windings of three relays 270, 271 and 272. It will be noted that relays 268 and 269 are interconnected for alternate operation in substantially the same manner as relays 174′ and 174″ in FIG. 2; relay 269 has an armature and front contact adapted to close an operating circuit for relay 207. Relay 267, in its operated condition, at its lower armature energizes relay 209 and breaks the holding circuits of relays 270, 271 and 272 which extend to the back contact of that armature. The energization of relay 267 also opens, at its uppermost armature, a holding circuit for relay 283.

The starting key 238 of the calculator, which may be ganged with the clearing switch 239 bridged across condenser 249 (though that switch has been shown as a separate key in FIG. 2), has two sets of contacts of which at least the lower one should be slow-releasing to insure a predetermined minimum closure time therefor. Key 238 by the closure of its upper contacts completes a circuit for a relay 273 extending to a conductor 286 which is normally grounded over an armature and back contact of a relay 274; conductor 286 is also included in the operating and holding circuits of relays 270, 271, 272 and 283. Another relay 275 is connected, in parallel with lamp 280, across the output of a voltage-level tester which has been schematically indicated as an amplifier 276 bridged across the condenser 248. A front contact and armature of a relay 279, energizable over the lowermost armature and front contact of relay 267 by way of conductor 286, is included in the operating circuit of relay 275. A switch 277 in the totalizer 246, controlled by the relay 225 over circuits to be described in connection with FIG. 6, is adapted to close an energizing circuit for relay 274 concurrently with the operation of recorder 245, thereby releasing the motor relay 273. The latter relay has its left-hand armature and front contact included in an operating circuit for tape-feeding motor 255 in series with the left-hand armature and back contact of relay 275 so that the motor is temporarily stopped if the voltage-level tester 276 operates to indicate an insufficient charge on condenser 248 when the multiply-divide relay 209 is actuated.

The lower contacts of key 238, when closed, operate a relay 281 which thereupon extends positive voltage to the lead IV′ while simultaneously breaking the energizing circuit of relay 240. This insures that all of relays 210, 220, 230 and 240 are operated when the first code signal is received, since in their released state they will successively apply the potential on lead IV′ to digit-storing relays 214, 224, 234, 244 with resultant closure of their own operating circuits at the lower armatures of these digit-storing relays as they lock to a conductor 282, the latter being connected to ground over contacts of relays 210 and 261.

The operation of the system of FIG. 4 will now be described.

The operator briefly closes switch 239, to clear the storage condenser 249 of any residual charge, and concurrently or subsequently closes momentarily the starting switch 238 whereby relay 273 is energized and locks, independently of that switch, over its right-hand armature and front contact in series with the armature and back contact of relay 274. Relay 273 at its left-hand armature and front contact closes, in series with the left-hand armature and back contact of relay 275, an energizing circuit for tape-feeding motor 255 whereby the advance of the previously perforated portion of tape 90 into reader 216 is initiated.

Let it be assumed that the first term entered on the tape was positive (switch 107 of FIG. 2 in its left-hand position) and that its magnitude is expressed in tenths, units, tens and hundreds (switch 105 down). In accordance with the code previously given, the first code combination will result in the concurrent application of potential to leads III′ and V′. At this stage each of relays 210, 220, 230, 240 is locked operated over an armature and front contact of at least one relay of its respective column 211–214, 221–224, 231–234 and 241–244. The pulse on lead V′ is thus transmitted to wire 256 to operate the relay 266 which attracts its armatures, the central one of these armatures completing a circuit for the energization of relay 268 by the simultaneous pulse on lead III′. Relay 268 operates ineffectually unless its companion relay 269 had been energized previously, in which case it now breaks the holding circuit of the latter relay to restore the sign relay 207 in totalizer 246 to normal; if the pulse had been on lead II′ rather than lead III′, relay 269 would have responded to deenergize relay 268 (if that relay had locked operated) and to actuate the relay 207 to indicate a minus sign.

The pulse on conductor 256 also energizes the relay 261 which at its lowermost armature removes ground from any of the digit-storing relays 211 etc. which had heretofore remained energized, such ground having been applied thereto via conductor 282 by the make-before-break upper armature of relay 210. To prevent a premature release of relay 210 which could leave some of these digit-storing relays operated, relay 210 is held over the second-lowest armature and front contact relay of 261 until its energizing circuit is broken by the operation of relay 262 to which the potential on lead 256 is applied by the middle armature of lead 261. The release of all the digit-storing relays also restores the associated switching relays 220, 230, 240 to normal so that, upon the cessation of the pulse, the armatures of all these relays are in the illustrated position. Relay 262, attracting its armature as long as the pulse on lead V′ persists since it is held energized over the lowermost armature of relay 210, prevents reoperation of that relay over the second-lowest armature of relay 261.

The next code combination arriving at reader 216 represents the setting of knob 101 in FIG. 2, thus digit "0.5" as identified by potential on leads I′, IV′ and V′. The signal on the first two of these leads results in the operation of relays 211 and 213 which lock to conductor 282 and prepare, at their inner upper armatures, parallel circuits for the operation of the associated group relay 210; the latter, however, cannot operate until the relay 262, energized as before from lead V′ via conductor 257, has released upon the disappearance of potential from the output leads of reader 216 whereby the premature operation of any relay of the second column 221–224 is prevented.

In analogous manner there will next be received a code combination representative of the setting of knob 102, e.g. "1" as denoted by a signal on leads I′ and V′. This energizes the relay 263, via conductor 258, and also the relay 221 which locks to conductor 282 and prepares the operating circuit of group relay 220 which is closed by the release of relay 263 upon the cessation of the signal. Likewise, the following code combination giving the setting ("90") of knob 103, represented by potential on leads II′, III′, IV′ and V′ will lock the relays 232, 233, 234 energized to cause the operation of group relay 230 upon the release of relay 264 which had temporarily been actuated via conductor 259. Finally, the code combination denoting the setting ("000") of knob 104, consisting of pulses on all five leads I′ to V′, analogously results in the locking of relays 241, 242, 243, 244 and the consequent energization of group relay 240 after a brief operation of relay 265 over conductor 260. Relay 265, having charged the condenser 278, upon its release discharges this condenser through the winding of relay 206 to energize that relay for a delayed replica of the start signal.

With all four group relays 210, 220, 230, 240 operated again, the following start signal (pulse on lead V) will once more operate the relay 266 to energize either the relay 268 or the relay 269, depending on the selected sign. The same sequence of operations may now be repeated for the registration of further terms which are to be additively or subtractively entered.

If it had been desired to register the setting of knobs 101–104 as read in the upper windows 101″–104″ of controller 100, the reversal of switch 105 would have resulted in the registration of a code element in fourth position, as previously described, upon the actuation of start key 106. The introduction of a new factor by the operation of key 109 causes the energization of lead I′ to actuate the relay 267 which, among other functions, releases the relay 283 if it had previously been operated. If switch 105 is in its alternate position, i.e. up, the appearance of a pulse on lead IV′ operates or reoperates the relay 283 concurrently with the energization of relay 268 or 269 by the start signal. Relay 283, when operated, at its inner armature locks over the uppermost armature of relay 267 which has meanwhile released; at its outer armature it operates the relay 205 in totalizer 246.

The signal on lead I′ due to the actuation of key 109, occurring invariably before entry of any new factor other than the first, in operating the relay 267 also resulted in the transitory energization of relay 209 in the totalizer. Concurrently, relay 267 in actuating relay 279 connects test relay 275 across the output of voltage-level tester 276; if this tester is unbalanced because of a charge on condenser 248 below its critical minimum, relay 275 locks to the tester and interrupts the operating circuit of motor 255 until the tester returns to normal. If a pulse appears simultaneously on lead IV′ to indicate that division rather than multiplication is desired, relay 270 operates via the second-highest armature of relay 267 and, being slow-releasing, locks over the bottom armature of that relay when the latter releases; totalizer relay 208 is energized by the upper armature of relay 270 in its attracted state.

Slow-releasing relays 271 and 272 are similarly controlled by relay 267 to operate and lock over its lowermost armature and back contact if the corresponding lead II′ or III′ is energized to indicate "square root" or "cube root," respectively; their operation causes the energization of either relay 226′ or relay 226″ in totalizer 246.

The final code combination received by reader 216, resulting from the operation of solution key 125, causes the application of voltage to lead IV′ whereby, with both relays 266 and 267 unoperated, relay 225 is actuated in the totalizer. Concurrently, square root and/or squared cube roots of the total may be indicated by a pulse on lead II′ and/or lead III′, this pulse energizing relay 227 and/or 228. It should be noted that relays 225, 227 and 228 release as soon as the corresponding pulse has disappeared.

The operation of relay 225 causes the appearance of the computation result on the indicator 235–237, together with its registration in recorder 245. It also closes, momentarily, switch 227 which operates relay 274 to interrupt the holding circuit of relay 273 whereby the motor 255 is cut off until the next actuation of switch 238. Relays 270, 271, 272 and 283, if operated, are released at the same time.

Figure 5:
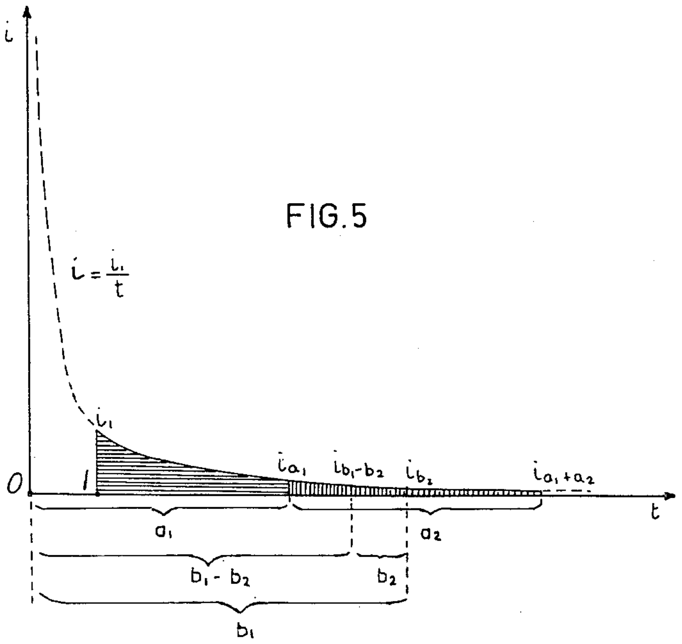
FIG. 5 is a graph illustrating the mode of operation of a computer as shown in FIGS. 2–4.

(III*b*) *Theory of Operation* (*FIG. 5*)

FIG. 5 illustrates the principle underlying the operation of the totalizer shown in 246 and described in greater detail hereinafter with reference to FIG. 6. Condenser 247, charged to a predetermined voltage, is discharged over the variable resistance represented by the resistor matrix 311–314 etc. whose value has been chosen in accordance with the selected numerical quantity by the operation of certain of the associated digit-storing relays 211–214 etc. The length of time required for this condenser to discharge to a predetermined fraction of its original voltage depends on this variable resistance and is, therefore, a measure of the selected quantity. This time is read on the abscissa $t$ of FIG. 5 and is measured by the linear rise of a charging voltage on condenser 248.

A current $i$, controlled by the voltage on condenser 248 so that its magnitude has a value $i_1/t$ inversely related to $t$, is caused to flow into condenser 249 while condenser 247 discharges. This current is, of course, available only for finite values of $t$, being advantageously generated during an interval from $t=1$ to $t=a_1$ (where $a_1$ is proportional to the selected quantity) as indicated by horizontal shading in FIG. 5. The charge accumulated on condenser 249 during this interval represents the integral $$\int_1^{a_1} i\cdot dt = i_1\int_1^{a_1}\frac{dt}{t} = i_1 \log_e a_1$$

as the current decays from $i_1$ to $i_{a_1}$. If it were desired to add $a_2$ to $a_1$, current flow would be continued for an interval $a_2$ (vertical shading) until the current has decayed to a value $i_{a_1+a_2}$; the final charge on condenser 248 would be equal to $i_1 \log_e (a_1+a_2)$.

For multiplication with, say, a factor $b_1$ it is merely necessary to discharge the primary condenser 248 and then to measure another interval from $t=1$ to $t=b_1$ during which the secondary condenser 249 receives a further charge of magnitude $i_1 \log_e$ to yield a total charge equal to $$i_1[\log_e (a_1+a_2)+\log_e b_1]=i_1 \log_e[(a_1+a_2)b_1]$$

For multiplication with, for example, $b_1-b_2$ both condensers 247 and 248 must be discharged simultaneously along abscissa $t$ and curve $i$, respectively, until the charge on condenser 248 has been reduced to the value $b_1-b_2$ while the current flowing out of condenser 249 reaches the magnitude $i_{b_1-b_2}$. For division by $b_1$ or $b_1-b_2$ the reversal of current is preceded by a discharge of condenser 248 after the storage of the charge corresponding to $a_1+a_2$.

If the value of the subtrahend $b_2$ should be so close to that of the minuend $b_1$ that the absolute value of the difference falls within the unshaded area below curve $i$, the system will be inoperative. It is then that the voltage-level tester 276 intervenes to give a disability signal (lighting of lamp 280) and/or to introduce into the condenser 248 a supplemental charge of a magnitude related to that already stored there; this supplemental charge advantageously equals that necessary to convert the original charge into its nearest decadic multiple greater than or equal to unity, being thus 9, 99 etc. times as large as that original charge. Multiplier indicator 237 at the same time registers the fact that the final total has to be divided by the decadic multiple so introduced, i.e. by 10, 100 and so forth, if the factor so supplemented was a multiplier; if it was a divisor, the total will have to be correspondingly multipled.

(IIIc) *Manual Operation* (*FIG. 6*)

Reference will now be made to FIG. 6 for a fuller explanation of the circuitry required to carry out the aforedescribed operations. In FIG. 6 all elements similar or analogous to those of FIG. 4 are designated by the same reference numerals with the addition of "*a*." Thus, totalizer relays 205, 206, 207, 208, 209, 225, 226′, 226″, 227 and 228 have been represented in FIG. 6 by switches **205*a*, 206*a*, 207*a*, 208*a*, 209*a*, 225*a*, 226*a′*, 226*a″*, 227*a* and 228*a*, respectively, performing corresponding functions but assumed to be manually operable. The variable resistance connected across input condenser 247*a* will be seen to include a unit resistor 321*a* in series with two cascade-connected potentiometers comprising resistors 302, 303 and wipers 302′, 303′**; it will be noted that only two digital orders are represented in FIG. 6 to simplify the diagram.

In the position of the potentiometers shown in the drawing, and with decimal switch **205*a* in its normal (open) position, the system is adjusted to register the number "92." Condenser 247*a*, whose lower terminal is grounded, is charged positively from a battery 350 by way of a vacuum triode 351 which is normally conductive so that the potential of the ungrounded terminal of that condenser will have a predetermined value close to the battery voltage. The conductivity of tube 351 is controlled by a bistable multivibrator, comprising two vacuum tubes 352 and 353, whose grids are biased negatively by a battery 354 via respective voltage dividers of which the one associated with tube 353 includes a resistor 355 having a tap connected to the grid of tube 351. One of the two grids of tube 352 is connected to the cathode of tube 351 and the ungrounded terminal of condenser 247*a*, the corresponding grid of its companion tube 353 being tied to a front contact of a relay 356 which is energizable from a battery 357 by the closure of starting switch 206*a*. Relay 356, which is slow-releasing to prevent more than a single attraction of its armature within the maximum discharge time of condenser 247*a*, on operating connects the upper grid of multivibrator tube 353 to the right-hand terminal of a condenser 358 which is normally at the potential of the negative terminal of bias battery 354. The tube 353, which is normally conductive, is thereby driven to cutoff and from its plate applies positive potential to the lower grid of tube 352 to reverse the operating condition of the multivibrator. This cuts off the tube 351 and allows condenser 247*a* to discharge through fixed unit resistor 321*a* and whatever portion of potentiometer 302 and/or 303 is connected in series therewith. When the charge on this condenser has dropped to a predetermined fraction, it cuts off tube 252 and restores the conductivity of tube 353** whereby the multivibrator returns to its normal state.

Condenser **248*a*, representing the storage element of the first accumulator stage, is connected between two conductors 359, 360 of which the former is held at a fixed negative potential by means of two batteries 361, 362 serially inserted between it and a grounded bus bar 363. Connected across the two conductors 359, 360 are a pair of oppositely poled constant-current devices, shown as two pentodes 364 and 365, in series with respective batteries 366 and 367**. The connections of the electrodes of these pentodes are conventional and the various circuit elements associated therewith, such as biasing batteries and resistors, are not described in detail.

Condenser **248*a* is normally shunted, via an armature and back contact of a relay 425, by an auxiliary condenser 248*b*** which in the operative state of the system forms part of its first accumulator stage.

Each of pentodes 364, 365 has a control grid connected to a source of highly negative potential, shown as a battery 368, by way of a respective tetrode 369, 370. These tetrodes are normally conductive, each having one of its grids connected to a respective contact engageable by the upper arm of positive-negative switch **207*a* which in turn is connected to the plate of multivibrator tube 352 through another battery 371; the latter applies to the arm of switch 207*a* a potential sufficiently negative to cut off the tetrode 369 or 370, depending on the switch position, whenever tube 352 conducts. With switch 207*a* in its right-hand (minus) position as illustrated, for example, tube 369 will be cut off while multivibrator 352, 353 is off-normal, i.e. while condenser 247*a* discharges from its normal voltage to the predetermined lower voltage limit which restores the multivibrator; this condition allows pentode 364 to conduct whereby the upper terminal of condenser 248***a* is charged negatively from battery 366. If switch 207*a* were in its alternate (plus) position, tetrode 370 would be cut off to enable the flow of reverse current into condenser 248*a* from battery 367 via pentode 365, thus resulting in a positive charging of the condenser or the dissipation of a pre-existing negative charge thereon. Upon the closure of switch 206*a*, therefore, condenser 248*a* acquires a charge of a magnitude determined by the setting of wipers 302', 303' and a polarity depending upon the position of switch 207*a*.

Also connected across condenser 248*a* are the input circuits of two vacuum triodes 372, 373 whose grids are tied to lead 360 and whose cathodes are connected to lead 359 in series with resistors 374, 375 and batteries 376, 377, respectively. Battery 376, which has the higher voltage of the two, drives the cathode of tube 372 sufficiently positive to prevent its conduction until the potential on the upper terminal of condenser 248*a* acquires a value of +1 on a suitable scale of voltage or charge units so selected that the condensers 248*a*, 248*b* can store charges of magnitudes up to ±100 units, i.e. all the values registrable on potentiometers 302 and 303, within the range of linear conductivity of pentodes 364 and 365. One unit charge is delivered to condensers 248*a*, 248*b* whenever only the resistor 321*a* is connected across the condenser 247*a* while the latter discharges.

Tube 372 shares a plate resistor 378 with another triode 379 which serves as an inverter stage for tube 373 and is energizable by a battery 380 and a cathode resistor 381. The grid of tube 379 is connected to a tap on the plate resistor 382 of tube 373, this resistor lying in series with a booster battery 383 in addition to battery 377. The junction of two resistors 384 and 385, connected as a voltage divider between conductor 359 and the plate of tube 372, is tied to the grid of a triode 276*a* and to the plate of a further triode 387 from whose plate a resistor 388 extends to that of tube 372. Between the latter plate and conductor 359 there is inserted alarm lamp 280*a* in series with a voltage divider consisting of three resistors 389, 390 and 391; the junction of resistors 389, 390 is connected to the plate of tube 276*a* while that of resistors 390, 391 is tied to the grid of tube 387. Batteries 377 and 383 are so chosen as to bias the two-stage amplifier 373, 379 to cutoff until condenser 248*a* acquires a negative voltage of absolute value greater than 1. A tap on resistor 378 is returned to the junction of batteries 361 and 362 via a conductor 392, a resistor 393 and a biasing battery 394.

When the charge on condensers 248*a*, 248*b* is more positive than +1, the current through resistor 378 varies proportionately to the grid voltage of tube 372. The resulting potential of conductor 395, which interconnects the plates of tubes 372 and 379, is communicated through resistor 385 to the grid of tube 276*a* and is low enough to limit the conductivity of that tube and to drive the grid of tube 387 positive, thus causing the plate of tube 387 to bias the grid of tube 276*a* still more negatively until the latter is cut off. Tube 387, which conducts, applies a positive potential to a lead 396 connected to the upper terminal of its cathode resistor 397.

When the condensers 248*a*, 248*b* have a combined charge more negative than −1, essentially the same conditions prevail except that the current through resistor 378 is now proportional to the absolute effective value of the grid voltage of tube 373. It should be noted that, within the effective range of the system, a given charge increment of either polarity on condensers 248*a*, 248*b* produces a fixed change in current flow through resistor 378 and, accordingly, a proportional voltage change on conductor 392.

If the charge on condensers 248*a*, 248*b* falls between these two limits, tubes 372 and 379 are both non-conducting so that the lead 395 carries a highly positive voltage to increase the conductivity of tube 276*a*, with consequent negative biasing of the grid of tube 387 and the application of still more positive potential to the grid of the former. Conductor 396 now carries a voltage which is negative with respect to ground and corresponds to that of battery 362. The increased flow of current through tube 276*a* and resistor 389 lights the lamp 280*a** to indicate that the system is in non-operating condition for purposes of multiplication or division.

The secondary accumulator stage of the system shown in FIG. 6 consists mainly of a pair of storage condensers 249*a'*, 249*a''* which are connected between grounded bus bar 363 and the positive terminal of a battery 397 in series with respective control tubes 398', 398'' and switching tubes 399', 399''. Control tubes 398', 398'' are shown as hexodes each with a first control grid connected to lead 396, a second control grid connected to lead 392 via contacts of switches 226*a'*, 226*a''*, a screen grid and a suppressor grid, the two last-mentioned grids being provided with conventional biasing means. Both tubes 398', 398'' are cut off by the negative potential on conductor 396 whenever the system is in its non-operating condition, described above.

The bias of hexodes 398', 398'' and the location of the tap on resistor 378 are so chosen that the current flowing through them into condenser 249*a'* or 249*a''*, respectively, varies inversely with the current through resistor 378 and, therefore, with the absolute value of the voltage across condenser 248*a*. The hexode current thus is a maximum whenever these tubes are unblocked by a voltage rise on conductor 396, its magnitude then having the value $i_1$ of FIG. 5; the relationship $$i=\frac{i_1}{t}$$

holds true over the entire operative range of the system, e.g., from 1 to 100 units of charge.

The switching tubes 399', 399'' can be rendered alternately conductive for enabling the charging of either condenser 249*a'* or condenser 249*a''* in dependence upon the setting of switches 207*a* and 208*a*. For this purpose the grids of these tubes are connected via respective diodes 400', 400'' to the grid-biasing resistances associated with two tetrodes 401', 401'' which together constitute a bistable multivibrator; operating potential is supplied to the plates of these tetrodes by a battery 402 with a grounded tap. Each tetrode has one grid biased by the plate of its companion tube and has another grid connected to a respective contact of a relay 403 whose armature, tied via a resistor 404 to the negative terminal of a battery 405, normally engages the back contact wired to the grid of tube 401' to cut off that tube and to apply a highly negative voltage by way of the associated diode 400' to the grid of switching triode 399'; when the relay 403 is energized, its armature impresses the negative voltage of battery 405 on the grid of tetrode 401'' and thence via diode 400'' to the grid of switching triode 399''. Multivibrator 401', 401'' operates in the conventional manner to intensify the negative potentional delivered to either of its inputs by relay 403. Thus, position voltage on conductor 396 will charge the condenser 249*a''* in the unoperated condition of relay 403 and the condenser 249*a'* in its operated state. Relay 403 is energizable from a battery 406 over the lower arm of switch 207*a* in cascade with the arm of switch 208*a* so as to be operated when switch 207*a* is in its plus position (+) with switch 208*a* in its division position (÷), or when switch 207*a* is in its minus position (−) with switch 208*a* in its multiplication position (×).

It will thus be apparent that upon the entry of a multiplicative factor (which normally includes the first factor of any operation) condenser 249*a''* will be charged for positive terms and condenser 249*a'* for negative terms, whereas upon the entry of a divisional factor these conditions are reversed. The switchover from one condenser to the other by the operation of switch 207*a*, indicative of a change of sign between terms, is invariably accompanied by a reversal of the charging current flowing into condensers 248*a*, 248*b*.

Switch 226*a*′, when operated, halves the control voltage applied to the inputs of hexodes 398′ and 398″ by connecting their second grids to the midpoint of resistor 393 whereby the charge introduced into condenser 398′ or 398″ is correspondingly halved to represent the logarithm of the square root of the factor to be entered; switch 226*a*″ similarly reduces the charge to one-third to register the cube root. It will be remembered that in the automatic system of FIGS. 2 to 4 the position of the corresponding fractionating switch 126 could not be changed effectively between the terms of one factor; this prohibition applies also to the manual system of FIG. 6. Switches 226*a*′ and 226*a*″ are generally respresentative of means for determining even-order and odd-order roots, respectively; it will be apparent that, at least insofar as absolute values are concerned, any fractional power of a factor may be registered by selection of a suitable tap on resistor 393.

Four wires 415, 416, 417, 418 extend from respective terminals of condensers 249*a*′ and 249*a*″. Numerical indicator 235*a*, essentially a voltmeter, is connected across wires 416 and 418, as is the recorder 245*a* in series with an armature and front contact of a relay 419. Solution switch 225*a*, when closed, at its two uppermost arms connects wires 416 and 418 to wires 417 and 415, respectively, whereby the two condensers are differentially interconnected and the voltage appearing at the input of indicator 235*a* corresponds to the difference between their respective charges. If the charge on condenser 249*a*″ outweighs that on condenser 249*a*′, the pointer of the indicator will be deflected to the right to give a reading greater than unity corresponding to the antilogarithm of the charge difference which is considered positive; in the opposite case, i.e. with a negative charge difference, the indicator reading will be a fraction. Naturally, if both charges are equal the input to the indicator will be zero and its reading will be unity.

Square-root switch 227*a*, if closed during actuation of switch 225*a*, connects across wires 416 and 418 by way of the third-highest arm of switch 225*a* a further condenser 420 whose capacitance equals that of condensers 249*a*′ and 249*a*″ combined whereby the input voltage to indicator 235*a* will be halved. Squared-cube-root switch 228*a* is similarly effective, by way of the third-lowest arm of switch 225*a*, to connect across these same wires a condenser 421 whose capacitance is two-thirds times the combined capacitance of condensers 249*a*′ and 249*a*″. It should be noted that both of these fractionating condensers 420, 421 are discharged over the respective arms of switch 225*a* when the latter is open.

Clearance switch 239*a* discharges the condensers 249*a*′ and 249*a*″ when closed concurrently with switch 225*a*. For automatic operation, as described in connection with FIG. 4, this switch would have two pairs of contacts for discharging both condensers simultaneously in the open state of switch 225*a*.

Since the second accumulator stage represented by condensers 249*a*′ and 249*a*″ responds only to the absolute magnitude of the charge on the first storage condenser 248*a*, it is desirable to provide means for separately indicating the sign of that charge for proper evalution of the logarithmic output of the totalizer. Also, if the square root or other even-order roots are taken of negative factors, the result will be an imaginary number whose absolute value will have to be multiplied by the numerical symbol "*i*" (not to be confused with the current *i* in FIG. 5). These two functions are carried out by a sign indicator comprising two rotary disks 236*a*′, 236*a*″ on a common shaft with a ratchet 407, this ratchet co-operating with a pawl 408 controlled by an electromagnet 409. Disks 236*a*′, 236*a*″ are divided into an even number of sectors (here eight) corresponding to the number of teeth on ratchet 407; they are individually illuminable by respective lamps 410′ and 410″.

Magnet 409 is energizable from battery 405 through a triode 411 whose grid is connected to the cathode terminal of resistor 381 by a circuit which includes voltage-dividing resistors 412, 413 and a biasing battery 414. When tube 379 conducts under the aforedescribed conditions, i.e. with condenser 248*a* charged negatively above its critical limit, tube 411 conducts and causes the attraction of pawl 408 whereby disks 236*a*′ and 236*a*″ rotate by one division to cause a change of sign as viewed through suitable windows (cf. FIG. 2). It will be noted that normally only the lamp 410″ is lit, in a circuit extending from ground to potential on lead 359 via the upper arm of switch 226*a*′, and that lamp 410′ lights instead when this switch is reversed for the taking of a square root.

The operating circuit of magnet 409 extends from ground via battery 405, tube 411, associated cathode and plate resistors 422, 423, a conductor 428, a resistor 424, a contact of multiply-divide switch 209*a* and the outer right-hand armature and back contact of relay 425 through a triode 426 to positive potential on a battery 427; tube 426 normally has its grid connected to lead 396, over the outer left-hand armature and back contact of a relay 480, so as to be blocked when the system is in its non-operating condition. The operation of magnet 409 also causes it to attract its lower armature onto its front contact, thereby energizing relay 480 in a circuit from battery 427 to ground and, at the inner left-hand armature of relay 480, bridging the conductors 359, 360 to short-circuit the condensers 248*a*, 248*b*. If tube 411 is not conducting, positive potential on its plate renders conductive a companion tube 386 whose cathode is biased by a battery 431 and which has its plate connected to lead 428 through the winding of a relay 432. The latter relay, in operating, also energizes the relay 480 to short-circuit the leads 359 and 360 along with condensers 248*a* and 248*b*. Thus, the condensers are invariably discharged upon any closure of switch 209*a*. Such discharge also occurs upon the closure of switch 225*a*, via the lowermost arm thereof. The remaining (i.e. second-lowest) arm of that switch, when in closed position, completes the operating circuit of relay 419 by way of a delay network 433 and a battery 434 to connect the input of recorder 245*a* across that of indicator 235*a*.

If tube 426 is cut off by negative potential on lead 396 during closure of switch 209*a*, negative voltage from a battery 435 is supplied through a resistor 436 to the base of a transistor 437 which is thereby rendered conductive to energize the relay 425. This relay, in operating, at its inner left-hand armature disconnects itself from its supply source 438 but remains energized for a prolonged period by means of the previously charged condenser 439 connected thereto. Two further condensers 440′, 440″ were charged over the inner two right-hand armatures of relay 425 from a battery 441 and, when the relay operates, are connected by way of these armatures to the plates of respective constant-current pentodes 442′, 442″ and to the upper grids of two tetrodes 443′, 443″, respectively. A discriminator tube 444, having its grid-cathode circuit connected across condenser 248*a* in series with a battery 445 and a cathode resistor 446 and further having its plate connected to a battery 447 through a resistor 448, determines the conductivity of pentodes 442′, 442″ and tetrodes 443′, 443″; the lower grids of the latter are connected to the plate and the cathode of tube 444 along with the control grids of tubes 442″ and 442′, respectively. With condenser 248*a* discharged, tube 444 maintains both tetrodes at cutoff; with a positive or a negative voltage on the upper terminal of this condenser, tube 443″ or 443′ will conduct while the associated condenser 440′ or 440″, respectively, is discharged through the corresponding pentode 442′ or 442″ at a rate inversely proportional to the charge of condenser 248*a*. The simultaneous discharge of the companion condenser 440″ or 440′ through pentode 442″ or 442′, respectively, is without effect since the corresponding tetrode 443″ or 443′ is cut off. The operation of relay 425 also disconnects condenser 248a from the grid of tube 444 which thus remains connected only to condenser 248b.

The suitably biased tetrodes 443′, 443″ obtain their plate current from a battery 449 through respective resistors 450′, 450″ which form part of two voltage dividers including two further resistors 451′, 451″ connected to the negative terminal of a battery 452. These tetrodes, in remaining conductive until the associated condenser 440′ or 440″ has been discharged to a predetermined level, control the charging tubes 364 and 365, respectively, through their grid-biasing tubes 369, 370 whose own second grids are connected via leads 453, 453″ to taps on the corresponding voltage dividers 450′, 451′ and 450″, 451″. The circuit constants are so chosen that the supplemental charge thus introduced into condenser 248a is of the same polarity as and nine times the magnitude of the combined charge originally present on condensers 248a and 248b, to provide a multiplication factor of ten. In order to compensate for this new factor, leads 453′ and 453″ are further connected to the bases of two transistors 454′, 454″ which are rendered conductive by the negative potential thereon to cause the passage of a current pulse from a battery 455′, 455″ through the primary of a respective transformer 456′, 456″; the secondaries of these transformers are inserted in two leads 457′, 457″ leading from ground to the grids of two triodes 458′, 458″. These triodes are connected between ground and the positive terminal of battery 397 in series with a cathode-biasing battery 459, two slow-releasing relays 460′ and 460″, respectively, and a conductor 461. Each of these relays, when energized, closes an operating circuit for a respective stepping magnet 463′, 463″ controlling a pawl 464′, 464″; the associated ratchets 465′ and 465″, mounted on a common shaft, control the pointer 237a of a sign indicator whose scale 237b shows decadic multiples and fractions to be used as corrective factors for the final result.

Suppose, for example, that a positive voltage smaller than its predetermined unit value on condensers 248a, 248b causes the threshold device 276a of the voltage-testing circuit to conduct along with discriminator tube 444. Relay 425 operates and initiates the discharge of condensers 440′, 440″ through pentodes 442′, 442″, respectively, yet only the discharge of condenser 440″ is effective since the relatively negative voltage on the plate of tube 444 cuts off the tetrode 443′. The conductivity of tube 442″ is controlled by the same plate voltage in such manner that condenser 440″ discharges during an interval proportional to the charge on condensers 248a, 248b as represented by the charge on the latter condenser, the former having been disconnected from tube 444 so that the introduction of a supplemental charge into condenser 248a will not affect the conductivity of that tube. Tube 443″, which is conductive as its two grids receive positive bias from resistor 448 and condenser 440″, respectively, drives the grid of tube 370 negative to enable the charging of condenser 248a through pentode 365 during the discharge of condenser 440″. Transistor 455″ also conducts and, through transformer 456″, energizes the tube 458″ and causes the successive operation of relay 460″ and magnet 463″; the latter attracts pawl 464″ to swing the pointer 237a′ to the left to indicate a corrective factor of 1/10.

The release of relay 425, occurring after the aforedescribed operations have been completed, reconnects condensers 248a, 248b and re-establishes the original test circuit for determining whether the charge on these condensers now exceeds the threshold of ±1. If it does, the system operates normally and key 209a may be restored; if it does not, the same steps may be repeated as the recharged condensers 440′, 440″ again discharge through pentodes 442′, 442″ and the indicator pointer 237a takes another step to denote a further supplemental charge. It should be noted that relay 480, when operated, disconnects the grid of tube 426 from test conductor 396 to prevent the supplemental charging circuit controlled by transistor 437 from responding to the discharge of condensers 248a, 248b.

If the initial voltage of condenser 248a is zero or so close to it as to prevent both tetrodes 443′, 443″ from conducting, the system will remain in its inoperative condition indefinitely; it will be understood that the threshold voltages of these tetrodes should be so selected as to permit only a reasonable number of successive supplemental charges to be introduced, in order to minimize the possibility of cumulative errors. A contact, not shown, may also be operated in or ahead of each limiting position of indicator pointer 237a to disconnect the corresponding tetrode so as to prevent further charging in the respective sense.

Switch 205a, when set in its alternate ("1/10") position, connects a relay 466 between ground on the back contact of the outer left-hand armature of relay 425 and a battery 467 over a lead 462 and an arm of switch 209a; relay 466, in operating, at its lowermost armature connects a lamp 468 across a battery 470 in lieu of a lamp 469 previously so connected. These lamps correspond to the sets of lamps 181″–184″ and 181′–184′, respectively, of FIG. 3. The operation of relay 466, occurring only with tube 426 conducting and switch 209a closed, also effects the charging of a normally discharged condenser 471 through the uppermost armature of the relay and battery 459 in series with the primary of a transformer 472 whose secondary lies in conductor 457″ whereby magnet 463″ is actuated to displace the pointer 237a to the left, thus indicating the necessity for multiplying the final result by 1/10 (or correspondingly modifying a corrective factor previously registered thereon). Finally, relay 466 at its intermediate armature locks to the make-before-break contact of switch 209a in order to remain operated after switch 209a has been reopened. By virtue of this arrangement it will not be possible, even with manual operation, to make any change in the setting of switch 205a effective except upon the operation of the multiply-divide key represented by switch 209a; if desired, however, start switch 206a may also be equipped with a contact for grounding the conductor 462 to operate the relay 466 if switch 205a happens to be on its right-hand contact.

The system of FIG. 6 is also shown provided with means for utilizing a reversal of the principle of supplemental charging for preventing the operation of the second accumulator stage of the totalizer in a range in which the charge on condensers 249a′ and/or 249a″ affects the linearity of operation of the associated hexodes 398′ and/or 398″. For this purpose the relay 480 in its actuated condition, apart from transitorily interconnecting these condensers by short-circuiting leads 416, 417 and 415, 418 at its two outer right-hand armatures and front contacts as heretofore described for the upper arms of switch 225a, operates a relay 472 which responds with a slight delay (being shunted by a condenser 478) and at its two left-hand armatures connects leads 415 and 417 to the grids of two triodes 479′ and 479″, respectively, after disconnecting them again from leads 418 and 416. Tubes 479′ and 479″ are connected across battery 427 in series with an inversely poled biasing battery 481 and respective cathode resistors 482′, 482″ having taps wired to the cathodes of a pair of thyratrons 483′, 483″ whose grids are fixedly biased by a battery 484. The energizing circuits of these thyratrons include the battery 427, the right-hand armature and front contact of relay 472 and the winding of a respective switching relay 473′, 473″ each having its outer armature connected to ground through an associated clamping condenser 474′ 474″ and a biasing battery 485; the back contact of this armature is connected to a tap on a respective cathode resistor 475′, 475″ of a corresponding vacuum triode 476′, 476″ each connected between battery 485 and a common source of plate current here shown to include battery 397 in series with a booster battery 477. The grids of triodes 476' and 476'' are respectively connected to leads 415 and 417, thus to the left-hand terminals of storage condensers **249*a'* and 249*a''*, and to the inner armatures of the associated switching relays 473', 473''. The front contacts of the last-mentioned armatures are tied to the cathodes of two further vacuum triodes 486', 486'', respectively, whose plates are connected to positive potential on lead 461 through the primaries of transformers 487', 487'' having their secondaries inserted in conductors 457'' and 457'**, respectively.

When the successive operation of relays 480 and 472 has mentarily interconnected the condensers **249*a'*, 249*a''* to balance their charges against each other whereby only the condenser originally having the larger charge is left with a voltage difference, the establishment of a connection between leads 415, 417 and the grids of amplifier tubes 479', 479'' reduces the conductivity of one of these tubes, e.g. the tube 479' if condenser 249*a'* remained charged, and correspondingly lowers the cathode potential of the associated thyratron, thus the tube 483'. If this cathode potential falls to a point at which the thyratron fires, this being the case if the condenser voltage approaches the limit of the normal operating range, switching relay 473' attracts its armatures to connect the cathode of tube 486' to conductor 415 while connecting its grid to clamping condenser 474' which had previously been charged, by its connection across a part of cathode resistor 475', to a voltage equal to that of condenser 249*a'*. Thus, the input voltage applied to tube 486' is independent of the charge of the storage condenser 249*a'*, this condenser being accordingly discharged by a fixed amount until the cathode of the tube has gone sufficiently positive to reach the cutoff point determined by the unvarying potential impressed upon its grid by the clamping condenser 474'. The extent of this discharge is invariably such as to swing the pointer of indicator 235*a* to the right by exactly a decadic division of its scale the concurrent energization of magnet 463'' by the passage of the discharge current through transformer 487' causing the pointer 237*a* to take a corresponding step to the left to give a compensating reading. If the excessive charge had been on condenser 249*a''*, this condenser would have been partly discharged through tube 486'' with consequent energization of magnet 463' via transformer 487'' to swing the pointer 237*a* to the right as compensation for a corresponding leftward movement of the pointer of indicator 235*a***.

It will be understood that, even with the safety measures described and others that may be analogously adopted (e.g. for the first accumulator stage comprising condensers **248*a*, 248*b*), the totalizer may on occasion be driven beyond its working capacity. To signal this condition, suitable disability indicators (e.g. lamps similar to warning light 280*a*) may be connected at various locations in the system, for example across part of resistor 378 or in series with battery 477**.

Figure 7:
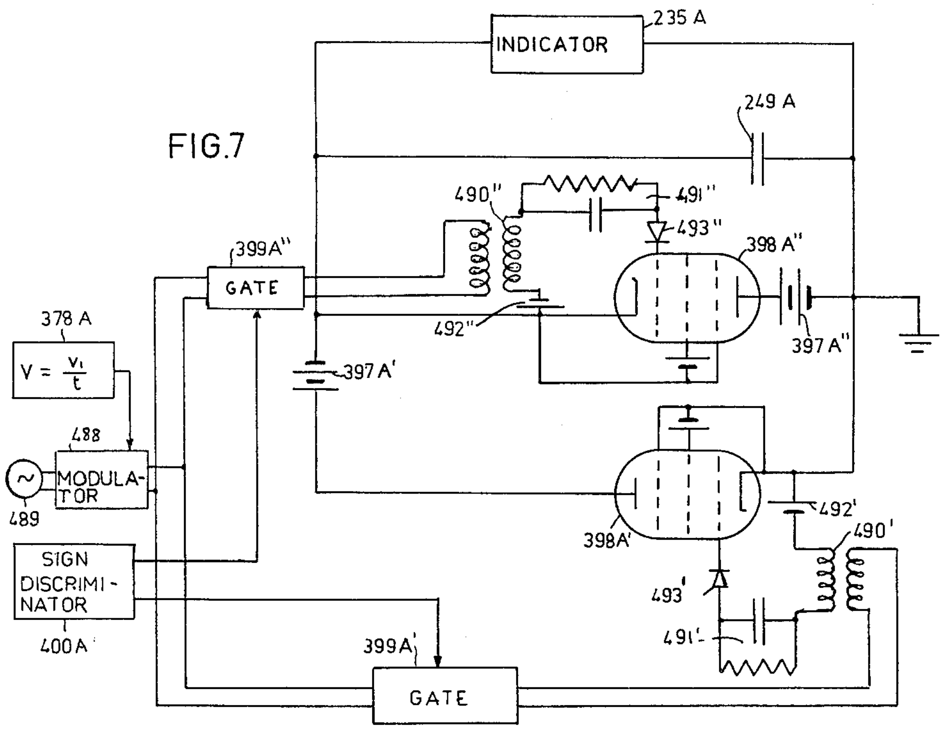
FIG. 7 illustrates a partial modification of the system of FIG. 6.

(III*d*) *Automatic Operation* (*FIGS. 7 and 8*)

In some instances, particularly for the automatic feeding of data to a computer at a rapid rate, it will be desirable to replace the two-condenser storage stage **249*a'*, 249*a''* of FIG. 6 by a single condenser (or group of condensers) adapted to be concurrently charged and discharged in either sense without periodic switching. This has been illustrated in FIG. 7 where the condenser 249A, connected across indicator 235A, is connected across two oppositely poled pentodes 398A', 398A'' in series with respective batteries 397A', 397A''**. The signal $$v=\frac{v_1}{t}$$

corresponding in FIG. 6 to the input voltage to hexodes 398', 398'' on lead 392, is here shown delivered by a circuit 378A to a modulator 488 which receives a high-frequency carrier voltage from an oscillator 489 and delivers it through respective gates 399A', 399A'' (functioning in a manner analogous to that of tubes 399', 399'' in FIG. 6) to a pair of input transformers 490', 490''; the latter energize the pentodes 398A', 398A'' via respective integrating networks 491', 491'', biasing batteries 492', 492'' and rectifiers 493', 493''. Gates 399A', 399A'' are alternately unblocked by a sign discriminator 400A. Elements 491', 493' and 491'', 493'' constitute two detector circuits which recover the input signal $v$ from the carrier envelope and feed it to the pentode selected in accordance with the sign of that signal and its place in a multiplier or a divisor, as previously explained with reference to the positions of switches **207*a* and 208*a***.

FIG. 8 illustrates a complete electrologarithmic computer based on the system of FIGS. 2–7 but adapted for automatic programing to perform a predetermined sequence of arithmetical operations on several sets of discrete values which may be derived from a corresponding number of, for example, continuously varying quantities. Two of these quantities, designated "INPUT I" and "INPUT II," are represented by positive voltages applied to two gate circuits 501, 502 which may each include a pair of oppositely poled vacuum triodes connected in parallel and are alternately unblocked by pulse trains 511, 512 from a gating-pulse generator 510. An operation-control circuit 500, which may be actuated by a prerecorded program on a perforated tape or other storage medium, is coupled to a logarithmic accumulator 520, essentially corresponding to the circuit arrangement of FIG. 6, to set its various keys or switches in accordance with the type of arithmetical operation desired; it also synchronizes the gating-pulse generator 510 with a timing-pulse generator 513 producing two pulse trains 514, 515 of opposite polarities.

Gate 501 is controlled jointly by the pulses 511 and 515 so as to be unblocked only during the shaded portion of each pulse 511; during this interval an input condenser 516 is connected across the signal source designated "INPUT I" so that its voltage corresponds to that of the source at the beginning of the negative pulse 515. When this pulse shuts the gate 501, condenser 516 begins to discharge through a constant-current device, represented by a hexode 517, whose cathode and suppressor grid are suitably biased by a battery 518 and whose first and second control grids are held at fixed potentials while its screen grid is connected to an output lead 519 of generator 513 to receive the pulse train 514. Lead 519 is also tied to a grid of a tetrode 521 whose plate is connected to a battery 522 through a resistor 523 and is further connected to the grid of a triode 524; the latter is energized by a battery 525 in series with a cathode resistor 526. The other grid of tetrode 521 is connected to the junction of condenser 516 with the plate of hexode 517; the cathode of this tetrode is biased positively by a battery 527.

Tubes 517 and 521 begin to conduct at the leading edge of a pulse 514 which coincides with the last (unshaded) portion of a pulse 511; as the condenser 516 discharges through hexode 517, the potential of the lower grid of tetrode 521 is progressively lowered until that tube cuts off as the condenser voltage drops to a predetermined value. Thus, tube 521 measures an interval whose duration varies with the signal on condenser 516 but must always be less than that of a pulse 514. Triode 524, operating as a cathode follower, applies a relatively negative voltage to a lead 528 which may be considered as the input lead to two tubes such as those shown at 369 and 370 in FIG. 6 to which it is selectively connected by the control circuit 500. Logarithmic accumulator 520 then operates in the aforedescribed manner to store a corresponding charge on its second-stage condenser or condensers.

The next pair of timing pulses 514, 515 coincides with the terminal portion (unshaded) of a gating pulse 512 and causes the condenser 516 to sample the instantaneous value of INPUT II, gate 502 being held open by pulse 512 in the absence of a pulse 151 during a period represented by the shaded part of pulses 512. Upon the subsequent occurrence of a pulse 514, condenser 516 discharges as before to enter the last-mentioned value in the second stage of accumulator 520 for additive, subtractive, multiplicative or divisive combination with the value previously registered thereon. The output of that stage, which may be a circuit of the type illustrated in FIG. 7, is applied to an amplifier tube 529 shown to be energizable by a battery 531 and sharing a cathode resistor 532 with a thyratron 533. The grid of the latter is connected, through a biasing battery 534, to the output lead of another logarithmic accumulator 530 generally similar to accumulator 520.

Accumulator 530 serves to determine the antilogarithm of the output of accumulator 520 and, for this purpose, has an input lead 535 connected to a junction of two resistors 536, 537 which bridge the battery 522 in series with a tetrode 538, a biasing battery 539 and a cathode resistor 540 therefor. Tetrode 538 has its two grids connected to output leads 541, 542 of timing-pulse generator 513 and gating-pulse generator 510, respectively, to receive the pulses 515 and 511 therefrom. Thus, tube 538 conducts during the shaded portion of each pulse 511 which occurs after the consecutive transmission of signals from INPUT I and INPUT II to accumulator 520. This results in the charging of a timing condenser 543 from a battery 544 through a hexode 545 whose first control grid is connected to the cathode of tube 538; hexode 545 has its second control grid connected through a biasing battery 546 to the plate of thyratron 533 so that this grid is driven sharply negative to cut off the hexode when the thyratron fires. The energizing circuit of thyratron 533 leads from battery 531 through the primary of a transformer 547, a vacuum triode 548 and a cathode resistor 549 for the latter; the grid of tube 548 is tied to conductor 542 so as to be biased to cutoff except during the occurrence of pulses 511.

Tubes 529 and 533 constitute a voltage-comparison circuit for the outputs of accumulators 520 and 530. Thus, owing to the provision of cathode resistor 532, the cathodes of both tubes follow the potential on the grid of tube 529 so that, with suitable selection of biasing battery 534, the thyratron 533 will ionize only when its grid voltage matches that of tube 529. When the thyratron fires, tube 545 ceases to conduct and the charge on condenser 543 remains constant. This charge is proportional to the time required for accumulator 530 to register an output voltage equaling that of accumulator 520, hence the condenser voltage varies directly with the antilogarithm or exponent of the logarithmic output of the latter accumulator. The condenser voltage can now be further utilized in another computer stage 550, similar to accumulator 520, to which it is fed via an amplifier 551, a switch 552 set by the controller 500, a gate 553 and circuit elements, not further illustrated, similar to those included between gates 501, 502 and accumulator 520. It will be understood that the charging of condenser 543 should be so controlled as to be completed in all instances within the interval denoted by the shaded portion of pulse 511.

Gate 553 has its control electrodes connected to conductors 519 and 542 so as to be open during the unshaded portion of each pulse 511, thus immediately after condenser 543 has reached its final charge. Thereafter, i.e. during the shaded portion of pulse 512, this condenser can be discharged through a switch 554 and a tetrode 555 having its two grids respectively connected to output lead 541 of generator 513 and to the second output lead 556 of generator 510. Tube 548, along with tube 538, has ceased to conduct upon the disappearance of pulse 511 from lead 542, thereby extinguishing the thyratron 533.

Switch 554, which along with all other switches of this automatic system is set by the controller 500, may be opened by the controller so as to maintain the charge on condenser 543 for two or more cycles whereby the same signal "X" may be iteratively fed to accumulator 550 for the computation of "$X^n$," "$n$" being any positive integer. The concurrent opening of a companion switch 554′ interrupts the charging circuit of the condenser through hexode 545. Irrespectively of the setting of switches 554 and 554′, the controller also effects the periodic discharge of accumulators 520, 530 and 550, in step with the operations of pulse generators 510 and 513, through momentary closure of a discharge switch such as switch 239*a* of FIG. 6.

Gate 553, when open, also enables transmission of the output of the sign indicator 557 of accumulator 520, corresponding to element 236 of FIG. 4, to the sign control 558 of accumulator 550 which corresponds to relay 207 of FIG. 4 or switch 207*a* of FIG. 6. Accumulator 550 may also receive signals from a further source, designated "INPUT III," through a gate 559 opening alternately with gate 553 in the manner described for gate circuits 501 and 502.

The system of FIG. 8 is also capable of computing trigonometric functions such as, for example, "sin X" and "cos X." To this end I provide a sine-wave oscillator 560 which is controlled by a synchronizing-pulse generator 561 so that its period equals the interval needed by the timing condenser 543 to acquire a charging-voltage increment of magnitude $2\pi$; this interval should, of course, equal a cycle (or an aliquot fraction thereof) of timer 513 so that the output of oscillator 560 goes through zero whenever the condenser 543 begins to charge at the beginning of a pulse 511. The oscillator supplies two contacts of a selector switch 562, one of them directly and the other through a 90° phase shifter 563, whereby either a sine function or a cosine function may be chosen. A gate 564, momentarily unblocked upon the firing of thyratron 533 by a pulse from transformer 547 which bucks the voltage of a battery 569, connects switch 562 to a condenser 565 whose potential thus corresponds to the instantaneous output voltage of oscillator 560 and which causes another condenser 566 to be similarly charged through an isolating amplifier 567. A further amplifier 568 applies a voltage proportional to the charge of condenser 566 to a contact of switch 552 which, in its alternate position, thus delivers a signal proportional to "sin X" or "cos X," rather than "X," to accumulator 550 by way of gate 553. Condenser 565 is discharged between firings of thyratron 533 by way of a further gate 570 under the control of a pulse 512 from conductor 556. Condenser 566 is dischargeable through a tetrode 571, having its grids connected in parallel with those of tetrode 555 to leads 542 and 556, yet a pair of switches 572, 572′ may again be opened to maintain the charge on this condenser for an indefinite period to enable its iterative transmission to accumulator 550 for the entry of powers such as "$\sin^n$ X" or "$\cos^n$ X."

The final output from computer stage 550 (or any further stage cascaded therewith) is shown applied to a different antilogarithmic converter represented by a cathode-ray tube 573 with a conventional electron gun 574 and an exponentially shaped collector electrode 575 of resistance material along which the beam 576 is deflected in response to the signal from the computer. Electrode 575 works into a balancing circuit 577 which produces either a positive or a negative antilogarithmic output voltage under the control of the sign indicator 578 of accumulator 550. Cathode-ray tube 573 can, with a suitably calibrated scale on a luminescent screen, also be used as a visual indicator similar to the device 235*a* of FIG. 6.

(IV) COMPUTER OPERATING WITH CONTINUOUSLY VARIABLE QUANTITIES (FIGS. 9 AND 10)

The system illustrated in FIG. 9 includes three logarithmic converters 601, 602, 603, simultaneously supplied with continuously varying signal voltages $s_1$, $s_2$, $s_3$ from respective sources, of which only the converter 601 has been illustrated in detail. It comprises an input resistor 604 across which the signal $s_1$ is developed and whose ungrounded upper terminal is connected via a gate 605 to a conductor 606. A condenser 607, initially discharged by a starting switch 608, is connectable by this switch to conductor 606 so as to be charged by the input signal.

Two oppositely poled rectifiers 609, 610 deliver positive and negative portions of the condenser voltage to the inputs of a pair of linear amplifiers 611 and 612, respectively, of which the latter is also an inverter so that the outputs of both are of the same polarity (e.g. positive). These outputs, combined, are supplied to a differentiation circuit 613 and, in parallel therewith, to an amplifier-inverter 614 whose output voltage varies inversely with its input voltage. The output of amplifier 614 is fed to an amplifier 615, together with the positive part of the output of differentiation circuit 613 as selected by a rectifier 616, and to an amplifier 617 along with the negative part of the output of circuit 613 as passed by a rectifier 618 through an inverter 639. The output terminals of amplifiers 615 and 617 are connected across a storage condenser 619 in parallel with corresponding terminals of converters 602 and 603. It should be noted that amplifier 615 is rendered conductive by an output of differentiator 613 when the magnitude and the slope of signal $s_1$ are of the same sign; otherwise the differentiator output is of a polarity to actuate the amplifier 617.

The amplifiers 615 and 617 are designed to produce an output current which is proportional to the product of the input voltage from amplifier 614 and the input voltage from differentiation circuit 613. Since the former input voltage is proportional to $1/s_1$ while the latter varies directly with $ds_1/dt$, the resulting charge $q_1$ on condenser 619 is proportional to $$\int\left(\frac{ds_1}{s_1\cdot dt}\right)dt$$

so that $q_1=k.\log_e s_1$ with regard to converter 601. In view of the combination of charges from all three converters, the total charge on condenser 619 will be $$q=q_1\pm q_2+q_3=k\cdot\log_e\left(s_1 \overset{\times}{\div} s_2 \overset{\times}{\div} s_3\right)$$

Condenser 607 also works into a minimum-signal detector 620 which is similar to the threshold circuit including tubes 372, 373, 379 in FIG. 6 and produces a positive output on a lead 637 whenever the condenser voltage has an absolute value equal to or greater than unity; the output of this detector is connected to a control electrode of amplifier 614 and to a disability indicator 621, e.g. a light such as warning lamp 208*a*, to give a non-operating signal and to cut off the amplifier 614 whenever the condenser voltage falls between the limits of $\pm 1$. A similar threshold detector 622, responsive to an excessive rise in the absolute value of the slope of the input signal so that the output $$\frac{\pm ds_1}{s_1\cdot dt}$$

of amplifier 615 or 617 surpasses a predetermined limit, is similarly controlled by these amplifiers to produce a positive pulse on the input lead to a flip-flop circuit 623 (e.g. a bistable multivibrator) which normally produces a positive voltage on an output lead 624 and a negative voltage on an output lead 625. Lead 624, connected to the gate 605 and to another disability indicator 626, blocks that gate and actuates the indicator when driven negative; lead 625 is connected to control electrodes of two further gates 627, 628 to place a positive enabling potential thereon when the circuit 623 is flipped by a pulse from detector 622. Gates 627, 628 are, however, provided with further input leads connected to a further differentiation circuit 640 by way of two rectifiers 629 and 630, respectively, the connection between the latter and the gate 628 also including an inverter 631; thus, a response of detector 622 to abnormal conditions will unblock either the gate 627 or the gate 628 according to whether rectifier 629 or rectifier 630 conducts. Differentiator 640 is energized directly from lead 606 so that the conductive state of these rectifiers depends on the sign of the slope $ds_1/dt$ irrespective of the sign of $S_1$. A sign indicator 641 is controlled by the output of rectifier 610.

Gate 627, when open, charges the condenser 607 more positively from a battery 632 through a suitably dimensioned charging resistor 633 designed to change the condenser voltage at a rate more gradual than that to which the detector 622 responds; in analogous manner, gate 628 charges the condenser more negatively from a battery 634 by way of a resistor 635. Since such charging occurs with gate 605 blocked, the condenser voltage will change progressively and independently of the actual signal voltage developed across resistor 604. A comparator 636, having inputs connected to both the condenser 607 and the resistor 604, delivers a restoring signal to flip-flop circuit 623 whenever the two voltages are alike; comparator 636 may be a circuit similar to the one which controls the tube 276*a* in FIG. 6, operating between suitably narrowed limits. Another output lead 638 of detector 620 produces a similar restoring signal to insure that gate 605 is open whenever amplifier 614 is blocked.

The operation of the system so far described will be better understood from the graph of FIG. 10 which shows at $s$ the variations of the input signal with time, plotted in absolute terms with reference to two thresholds represented by the horizontal lines $L_1$ and $L_2$ at voltages $+1$ and $-1$.

Let it be assumed that at the time $t_0$, when the switch 608 is thrown, the signal $s$ has a magnitude $\pm s_0$ greater than unity. With condenser 607 discharged at this instant, amplifier 614 is initially blocked by detector 620 until the condenser has charged at time $t_1$ along dot-dash line $s'$ to line $L_1$; the non-conductive state of this amplifier is indicated by the horizontally shaded area $A_0$. Since the signal voltage on resistor 604 is at this point still higher than the voltage of condenser 607, the latter tends to continue charging along line $s'$ (dotted), but the resulting rise in the output voltage of amplifier 615 (positive values being assumed) triggers the detector 622 to reverse the flip-flop 623 whereby gate 605 is blocked and the charging of the condenser continues via gate 627 at the rate determined by battery 632 and resistor 633; this is shown in FIG. 10 by the exponential curve $s''$ (dot-dash lines) which delimits an area $A_1$, identified by vertical shading, during which flip-flop 623 is in its off-normal state. At time $t_2$, when curve $s''$ intercepts curve $s$, comparator 636 acts to restore the circuit 623 to normal and to open the gate 605 while blocking the gate 627; the system now works on the signal voltage as represented by curve $s$ until, at a later instant $t_3$, the slope of that curve rises sharply to reverse the flip-flop again for a further charging of the input condenser 607 along exponential curve $s'''$, delimiting an area $A_2$, until the curves again intersect at time $t_4$. Next, at instant $t_5$, the condenser voltage dips below the value of $+1$; detector 620 cuts off the amplifier 614 and, accordingly, prevents any further change in the charge of output condenser 619 by converter 601 until the signal passes the threshold $L_1$ at time $t_6$. The horizontally shaded area of inoperativeness has been designated $A_3$. The signal, still positive, then begins to drop sharply at instant $t_7$ so that gate 628 is enabled by flip-flop 623 to discharge the condenser 607 along curve $s^{iv}$ which is the converse of curve $s''$. This operation continues along vertically shaded area $A_4$ until, at time $t_8$, curve $s^{iv}$ is intercepted by the threshold $L_1$ and detector 620 goes into effect to block the amplifier 614 and to restore the circuit 623. This action also reopens the gate 605 so that condenser 607 is discharged at a relatively rapid rate, along curve $s^v$, as this curve approaches the curve $s$ and merges with it at time $t_9$. This occurs within the horizontally shaded area $A_5$ which terminates at instant $t_{10}$ when curve $s$ intersects line $L_2$. At this point the steep negative slope of curve $s$, combined with the large output current produced by amplifier 617 ($s$ and $ds/dt$ being both negative), reopens the gate 628 while blocking the gate 605 so that condenser 607 further discharges along curve $s^{vi}$ which delimits the vertically shaded area $A_6$. Curves $s^{vi}$ and $s$ meet at time $t_{11}$, whereupon normal operation continues.

If desired, a large resistor 655 may be connected between the ungrounded terminals of resistor 604 and condenser 607 to let the condenser potential follow more closely the input signal when gate 605 is blocked.

It should be noted that the horizontally shaded areas $A_0$, $A_3$ and $A_5$ represent periods of inoperativeness marked by a signal from disability indicator 621 whereas the vertically shaded areas $A_1$, $A_2$, $A_4$ and $A_6$ are similar periods characterized by the operation of disability indicator 626. When neither of these indicators in any of the three converters 601, 602 and 603 is operated, the charge $q$ on condenser 619 is a true indication of the logarithm of the product and/or quotient of signals $s_1$, $s_2$, $s_3$.

To evaluate the logarithmic result $q$, I have shown connected across condenser 619 an amplifier 642 working into a load resistor 643 whose ungrounded terminal is connected to one input electrode of a comparator 644 similar to circuit 636. A constant-current device 645, e.g. a pentode, charges a first-stage condenser 646 from a battery 647 while a reciprocal amplifier 648 progressively adjusts a circuits 649 controlling the charging of a second-stage condenser 650 from the same source. The system is thus similar to that shown in FIG. 6, the control circuit 649 being also coupled to a threshold device 651 which starts the charging of condenser 650 by a current $$i=\frac{i_1}{t}$$

when the charge on condenser 646 has reached unity. When the potential of condenser 650 matches that applied by amplifier 642 to comparator 644, which has another input connected to the ungrounded terminal of that condenser, the comparator energizes two thyratrons 652 and 653 for concurrently discharging both condensers 646 and 650, respectively.

The operation is repeated as soon as the thyratrons 652 and 653 are extinguished whereby there is produced on condenser 646 a sawtooth voltage whose amplitude is proportional to the charging time $t$ of condenser 650 to the desired logarithmic value and, therefore, to the exponent of that value. A peak-rider circuit 654 of conventional design, detecting the envelope of this sawtooth voltage, delivers the final signal of absolute magnitude $s_1+s_2+s_3$ which has to be given a negative sign if an odd number of sign indicators 641 in converters 601–603 are operated.

It will be understood that, in lieu of circuit 642–654, a cathode-ray-tube exponential circuit such as the one shown in FIG. 8 may be used in the system of FIG. 9 to produce the antilogarithmic output desired.

The signals supplied to the systems of FIGS. 8 and 9 may be the electric analogs of physical variables, such as speed, temperature or weight, or may represent purely mathematical quantities. It will also be apparent that the output of the system, or of some stage thereof, may be fed back as one of its inputs. In particular, a computer as shown in FIG. 8 may be utilized to determine sums and/or differences of products and/or quotients by delivering the antilogarithmic output voltage of condenser 543 to, say, INPUT I thereof and substantially concurrently supplying another such voltage, from the same or a different exponential converter stage, to INPUT II for additive or subtractive combination in accumulator 557 as described with reference to FIG. 6.

Though I prefer the use of vacuum tubes as amplifying and control elements by reason of their low electric leakage, it is to be understood that other devices may be used and that, in general, the circuits disclosed may be modified in various ways, including combination of features from different embodiments within the limits of compatibility, without departing from the spirit and scope of my invention except as further defined in the appended claims.

I claim:

1. In an analog computer, in combination, circuit means for producing an electric input signal varying from a value of unity at a time $t_1$ to a value representing the analog of a given quantity $s$ of absolute value greater than unity at a time $t$, charge-storing means, generating means controlled by said circuit means for supplying to said charge-storing means a charging current $i$ of a magnitude $$\frac{k\cdot ds}{s\cdot dt}$$

where $k$ is a proportionality factor and $ds/dt$ is the time derivative of said input signal throughout an interval in which the latter changes from unity to the analog of $s$, thereby producing a charge $$q=k\int_{t_1}^{t} i\cdot dt$$

representing the analog of the logarithm of said quantity, and output means connected to said charge-storing means for indicating the magnitude of said charge, said circuit means including a time-constant network adapted to produce a signal varying exponentially with time, said generating means comprising a source of constant current.

2. In an analog computer, in combination, circuit means for producing an electric input signal varying from a value of unity at a time $t_1$ to a value representing the analog of a given quantity $s$ of absolute value greater than unity at a time $t$, charge-storing means, generating means controlled by said circuit means for supplying to said charge-storing means a charging current $i$ of a magnitude $$\frac{k\cdot ds}{s\cdot dt}$$

where $k$ is a proportionality factor and $ds/dt$ is the time derivative of said input signal throughout an interval in which the latter changes from unity to the analog of $s$, thereby producing a charge $$q=k\int_{t_1}^{t} i\cdot dt$$

representing the analog of the logarithm of said quantity, and output means connected to said charge-storing means for indicating the magnitude of said charge, said circuit means comprising a source of constant current, said generating means including a source of current varying inversely with time.

3. In an analog computer, in combination, a first capacitive stage, first circuit means responsive to an input signal for supplying to said first stage a first charging current of a magnitude determined by said input signal, a second capacitive stage, second circuit means controlled by said first stage for supplying to said second stage a second charging current of a magnitude varying directly with the time derivative and inversely with the magnitude of the charge on said first stage due to said first charging current, and output means connected to said second stage for indicating the magnitude of the charge thereon due to said second charging current.

4. The combination according to claim 3, further comprising threshold means connected to said first stage for temporarily disabling said second circuit means upon the magnitude of said first charge falling below a predetermined value.

5. The combination according to claim 3, further comprising detector means controlled by said second circuit means for temporarily disabling said first circuit means upon a rise beyond a predetermined limit of the product of said time derivative with the reciprocal value of the magnitude of the charge on said first stage, and comparator means for reactivating said first circuit means upon said input signal reaching a value corresponding to the charge remaining on said first stage.

6. The combination according to claim 5, further comprising auxiliary charging means controlled by said detector means for progressively varying the charge on said first stage at a predetermined rate in a sense corresponding to the sign of said time derivative.

7. An analog computer comprising a first charge-storing stage, first charging means for said first stage adapted to supply thereto a constant charging current, control means for said first charging means responsive to an input signal for maintaining said first charging means effective over an interval proportional to the magnitude of said signal, a second charge-storing stage, second charging means controlled by said first stage for supplying to said second stage a charging current of a magnitude varying inversely with the charge on said first stage due to said constant current, cutoff means coupled with said first charging means for inactivating said second charging means during a predetermined portion of said interval, and output means connected to said second stage for indicating the magnitude of the charge thereon due to said inversely varying current.

8. An analog computer comprising a first charge-storing stage, first charging means for said first stage adapted to supply thereto a constant charging current, control means for said first charging means responsive to an input signal for maintaining said first charging means effective over an interval proportional to the magnitude of said signal, a second charge-storing stage, second charging means controlled by said first stage for supplying to said second stage a charging current of a magnitude varying inversely with the charge on said first stage due to said constant current, cutoff means coupled with said first charging means for inactivating said second charging means during a predetermined initial portion of said interval, and output means connected to said second stage for indicating the magnitude of the charge thereon due to said inversely varying current.

9. An analog computer comprising a first charge-storing stage, first charging means for said first stage adapted to supply thereto a constant charging current, control means for said first charging means responsive to an input signal for maintaining said first charging means effective over an interval proportional to the magnitude of said signal, a second charge-storing stage, second charging means controlled by said first stage for supplying said second stage a charging current of a magnitude varying inversely with the charge on said first stage due to said constant current, cutoff means controlled by said first stage for inactivating said second charging means in the absence of a charge on said first stage having an absolute magnitude above a predetermined limit, and output means connected to said second stage for indicating the magnitude of the charge thereon due to said inversely varying current.

10. An analog computer for additively and multiplicatively combining a succession of arithmetical values, comprising a first charge-storing stage, first charging means for said first stage adapted to supply thereto a constant charging current, control means for said first charging means responsive to an input signal representative of any one of said values for maintaining said first charging means effective over an interval proportional to the magnitude of said signal, a second charge-storing stage, second charging means controlled by said first stage for supplying to said second stage a charging current of a magnitude varying inversely with the charge on said first stage due to said constant current, cutoff means controlled by said first stage for inactivating said second charging means in the absence of a charge on said first stage having an absolute magnitude above a predetermined limit, discharge means for said first stage selectively operable for multiplication but left unoperated for addition, and output means connected to said second stage for indicating the magnitude of the charge thereon due to said inversely varying current.

11. An analog computer for additively, subtractively, multiplicatively and divisively combining a succession of arithmetical values, comprising a first charge-storing stage, first charging means for said first stage adapted to supply thereto a constant charging current of either polarity, control means for said first charging means responsive to an input signal representative of any one of said values for maintaining said first charging means effective to deliver a current of a polarity dependent on the sign of said signal over an interval proportional to the magnitude of said signal, a second charge-storing stage, second charging means controlled by said first stage for supplying to said second stage a charging current of either polarity and of a magnitude varying inversely with the charge on said first stage due to said constant current, switch means for selectively inverting the relative polarities of said currents, cutoff means controlled by said first stage for inactivating said second charging means in the absence of a charge on said first stage having an absolute magnitude above a predetermined limit, discharge means for said first stage selectively operable for multiplication and division but left unoperated for addition and subtraction, and output means connected to said second stage for indicating the magnitude of the charge thereon due to said inversely varying current.

12. A computer according to claim 11, further comprising actuating means for said discharge means controlled by said cutoff means for being maintained inoperative in the inactivated condition of said second charging means.

13. A computer according to claim 12, further comprising supplemental charging means controlled by said cutoff means and by said actuating means for supplying to said first stage an added charge representing a predetermined multiple of a charge already stored thereon, said discharge means being connected to said supplemental charging means for preventing the operation thereof on being operated by said actuating means, and indicator means responsive to operation of said supplemental charging means for signaling the delivery of said added charge.

14. A computer according to claim 11 wherein said control means includes a selector circuit with a multiplicity of settings for establishing corresponding operating intervals for said first charging means, display means for assigning an individual numerical value to each setting, and switchover means for selectively multiplying all of said values with a predetermined factor, further comprising signaling means responsive to the operation of said switchover means for registering a corrective factor.

15. A computer according to claim 11, further comprising sign-indicator means connected to said first stage for registering a signal indicative of the polarity of the charge on said first stage.

16. A computer according to claim 11, further comprising fractionating means selectively connectable in circuit relationship with said second charging means for reducing said inversely varying current to a predetermined fraction, thereby replacing the logarithm of a factor by that of a root thereof.

17. A computer according to claim 11, further comprising fractionating means selectively connectable in circuit relationship with said second stage for reducing the final charge thereon to a predetermined fraction, thereby indicating the logarithm of a root of the result of computation.

18. A computer according to claim 11 wherein said control means includes a timing circuit with a multiplicity of settings for establishing corresponding operating intervals for said first charging means, contact means for selectively operating said discharge means and said switch means, selector means for said timing circuit, key means for the operation of said contact means, signal-storing means adapted to be marked by said selector means and said key means, reading means adapted to cooperate with said signal-storing means for supplying respective actuating signals to said timing circuit and to said contact means, and feed means for advancing said signal-storing means so marked to said reading means at a predetermined rate.

19. In an analog computer, in combination, first logarithmic converter means for producing the logarithmic analog of a combination of input signals, second logarithmic converter means for producing the logarithmic analog of a progressively varying control signal, comparator means connected to the outputs of both said converter means for detecting a matching of said logarithmic analogs, and output means controlled by said comparator means and connected to the input of said second converter means for ascertaining the magnitude of said control signal in the matching condition of said logarithmic analogs.

References Cited in the file of this patent

UNITED STATES PATENTS

| | | |
|---|---|---|
| 2,403,429 | Anderson | July 9, 1946 |
| 2,410,550 | Padva | Nov. 5, 1946 |
| 2,631,249 | Smith | Mar. 10, 1953 |